United States Patent
Kakihira et al.

(10) Patent No.: US 7,868,121 B2
(45) Date of Patent: *Jan. 11, 2011

(54) ANTIOXIDANTS AND RECORDING MEDIA BY USING THE SAME

(75) Inventors: Hiroshi Kakihira, Joso (JP); Hirokazu Hyakuda, Joso (JP)

(73) Assignee: Canon Finetech Inc., Misato-shi (JP)

( * ) Notice: Subject to any disclaimer, the term of this patent is extended or adjusted under 35 U.S.C. 154(b) by 1126 days.

This patent is subject to a terminal disclaimer.

(21) Appl. No.: 11/578,243

(22) PCT Filed: Apr. 28, 2005

(86) PCT No.: PCT/JP2005/008135

§ 371 (c)(1),
(2), (4) Date: Oct. 12, 2006

(87) PCT Pub. No.: WO2005/105881

PCT Pub. Date: Nov. 10, 2005

(65) Prior Publication Data

US 2007/0273716 A1   Nov. 29, 2007

(30) Foreign Application Priority Data

Apr. 30, 2004 (JP) .............. 2004-136729
Apr. 30, 2004 (JP) .............. 2004-136732

(51) Int. Cl.
*C08G 18/00* (2006.01)
*G01D 15/16* (2006.01)
*G01D 15/18* (2006.01)

(52) U.S. Cl. .............. 528/44; 528/85; 346/143
(58) Field of Classification Search ............. 346/134; 528/44, 85

See application file for complete search history.

(56) References Cited

U.S. PATENT DOCUMENTS

| | | | |
|---|---|---|---|
| 3,968,066 A | 7/1976 | Mueller | |
| 4,035,337 A | 7/1977 | Herweh et al. | |
| 4,666,618 A | 5/1987 | Hentschel et al. | |
| 5,314,942 A * | 5/1994 | Coogan et al. | 524/457 |
| 5,670,249 A | 9/1997 | Tanuma | |
| 6,149,678 A | 11/2000 | DiDomenico et al. | |
| 6,893,723 B2 * | 5/2005 | Kurose | 428/423.1 |
| 7,601,779 B2 * | 10/2009 | Hyakuda et al. | 524/591 |
| 2004/0072026 A1 * | 4/2004 | Kurose | 428/694 B |
| 2007/0148471 A1 | 6/2007 | Rukavina et al. | |

FOREIGN PATENT DOCUMENTS

| | | |
|---|---|---|
| EP | 1 640 394 | 3/2006 |
| JP | 57-074192 | 5/1982 |
| JP | 57-087989 | 6/1982 |
| JP | 60-072785 | 4/1985 |
| JP | 61-146591 | 7/1986 |
| JP | 61-154989 | 7/1986 |
| JP | 61-163886 | 7/1986 |
| JP | 01-115677 | 5/1989 |
| JP | 07-195824 | 8/1995 |
| JP | 07-314883 | 12/1995 |
| JP | 08-150773 | 6/1996 |
| JP | 11-222513 | 8/1999 |
| JP | 11-240247 | 9/1999 |
| JP | 2001-071627 | 3/2001 |
| JP | 2001-071630 | 3/2001 |
| JP | 2001-139850 | 5/2001 |
| JP | 2001-301315 | 10/2001 |
| JP | 2002-059638 | 2/2002 |
| JP | 2002-187344 | 7/2002 |
| JP | 2002-307812 | 10/2002 |
| JP | 2003-080826 | 3/2003 |
| JP | 2003-165950 | 6/2003 |
| JP | 2004-345309 | * 12/2004 |

OTHER PUBLICATIONS

Machine translation of JP2004-345309. Dec. 2004.*
International Preliminary Examination Report dated Nov. 23, 2006.
Communication in European Patent Application No. 05 736 711.2, dated Nov. 19, 2009.

* cited by examiner

*Primary Examiner*—Mark Eashoo
*Assistant Examiner*—Liam J Heincer
(74) *Attorney, Agent, or Firm*—Fitzpatrick, Cella, Harper & Scinto

(57) ABSTRACT

"A high-molecular compound or high-molecular antioxidant obtained by reacting at least three compounds of (A) a sulfur-containing organic compound having at least two active hydrogen atoms, (B) a polyisocyanate compound having at least two isocyanate groups and (C) an amine compound having at least two active hydrogen atoms and then cationizing with an acid at least some of amino groups in a resultant reaction product" or "a high-molecular antioxidant obtained by reacting at least three compounds of (A) a sulfur-containing organic compound having at least two active hydrogen atoms, (B) a polyisocyanate compound having at least two isocyanate groups and (E) a nonionic polyol compound having at least two active hydrogen atoms" and a recording medium obtained by using the high-molecular antioxidant. The present invention provides a recording medium, which effectively prevents discoloration or color fading of images by acidic gas in the atmosphere and light and also migration of the images at high temperature and high humidity, and therefore, is suited for the long-term storage of the images.

16 Claims, No Drawings

ANTIOXIDANTS AND RECORDING MEDIA BY USING THE SAME

TECHNICAL FIELD

This invention relates to antioxidants capable of effectively preventing discoloration or color fading of images, which are caused by acidic gas in the atmosphere and light, and also migration of the images at high temperature and high humidity, and also to recording media making use of the antioxidants and suited for the long-term storage of images.

BACKGROUND ART

An inkjet recording system is a recording method that performs recording of pictures, characters and the like (hereinafter called "images") by causing tiny droplets of inks to adhere a recording medium such as paper in accordance with one of various operation principles and at the same time, causing the solvent component of each ink to penetrate into the recording medium or to evaporate such that its colorant component is allowed to deposit on the recording medium. The inkjet recording system is characterized in that it is excellent in high-speed printing, low operating noise and the applicability for the recording of a wide variety of patterns; and it also can readily perform multicolor recording, and requires neither development nor image fixing.

In particular, multicolor inkjet recording systems are rapidly finding increasing utility as image recording systems for various information equipment in recent years, because images formed by multicolor inkjet recording can provide records favorably comparable with multicolor prints by the form-plate-dependent printing or images by color photography and moreover, and have a merit that multicolor inkjet recording is lower in printing cost than usual printing techniques or photographic techniques when the number of copies or prints to be made is small. Accordingly, the use of multicolor inkjet recording is spreading to fields where the recording of full color images is needed, for example, such as the output of image designs in the design world, the production of color block copies in the printing field, said color block copies being required to have quality as high as photographic images, and samples of frequently-replaced billboards and merchandises. Owing to the wide spread of personal computers and digital still cameras in recent years, there is also an increasing number of occasions to output photographic images by inkjet printers at home.

Under the current circumstances, however, images recorded by inkjet printers undergo significant color fading or discoloration by acidic gas in the atmosphere and light in comparison with the images of multicolor prints by form-plate-dependent printing or color photographs, and therefore, are not suited for the long-term storage of the images. Accordingly, there is a very strong demand for the prevention of color fading or discoloration of images, and numerous proposals have been made to date for making improvements in this respect.

To make improvements in gas fastness, for example, Patent Document 1 discloses recording media with thioether compounds incorporated therein, Patent Document 2 discloses recording media with hydrazide compounds incorporated therein, and Patent Documents 3 and 4 disclose recording media with thiourea derivatives, thiosemicarbazide derivatives, thiocarbohydrazide derivatives or the like incorporated therein. Further, Patent Document 5 discloses recording media each of which contains, in combination, one of thiourea derivatives, thiosemicarbazide derivatives and thiocarbohydrazide derivatives and one of iodine, iodides, dithiocarbamic acid, thiocyanate salts and thiocyanate esters.

As methods for making improvements in light fastness, on the other hand, Patent Document 6, Patent Document 7 and Patent Document 8 disclose recording media with phenolic antioxidants or benzophenone or triazole ultraviolet absorbers incorporated therein.

In addition, recording media containing hindered amine compounds are proposed in Patent Document 9, and those containing hydrazide compounds are proposed in Patent Document 10.

Furthermore, Patent Documents 11 and 12 disclose recording media with gas fastness and light fastness improved by incorporating ascorbic acid, erythorbic acid or sodium erythorbate in ink-receiving layers, and Patent Documents 13, 14 and 15 disclose recording media with gas fastness and light fastness improved by incorporating flavonoid in ink-receiving layers.

However, these conventionally-known methods for providing recording media with gas fastness and/or light fastness have not fully brought about their effects, and are not considered to be sufficient for the improvement of the properties. Moreover, many of the above-mentioned compounds are insoluble in water so that they cannot be added to water-based coating formulations, and even in the case of water-soluble compounds, it is difficult to actually apply them to recording media due to a problem that they deteriorate water resistance and the migration of images at high temperature and high humidity.

Patent Document 1: JP-A-01-115677
Patent Document 2: JP-A-61-154989
Patent Document 3: JP-B-04-034953
Patent Document 4: JP-A-07-314883
Patent Document 5: JP-A-08-025796
Patent Document 6: JP-A-57-074192
Patent Document 7: JP-A-57-087989
Patent Document 8: JP-A-60-072785
Patent Document 9: JP-A-61-146591
Patent Document 10: JP-A-61-154989
Patent Document 11: JP-A-07-195824
Patent Document 12: JP-A-08-015077
Patent Document 13: JP-A-2001-071627
Patent Document 14: JP-A-2001-139850
Patent Document 15: JP-A-2001-301315

DISCLOSURE OF THE INVENTION

Problems to be Resolved by the Invention

With the foregoing actual circumstances in view, the present invention has as objects thereof the provision of a high-molecular antioxidant capable of effectively preventing the discoloration or color fading of images, which are caused by acidic gas in the atmosphere and light, and the migration of images at high temperature and high humidity and a recording medium making use of the high-molecular antioxidant and suited for the long-term storage of images.

Means for Resolving the Problems

The present inventors have proceeded to carry a variety of investigations to obtain an antioxidant capable of effectively preventing the discoloration or color fading of images, which are caused by acidic gas in the atmosphere and light, and the migration of images at high temperature and a recording medium suited for the long-term storage of images. As a result, it has been found that the above-mentioned problems can be resolved by incorporating a high-molecular compound of a specific structure as an antioxidant in one or more ink-receiving layers of a recording medium, said one or more ink-receiving layers being arranged on at least one side of a base material, leading to the completion of the present invention.

Described specifically, the present invention provides a high-molecular antioxidant (hereinafter called "the first antioxidant") obtained by reacting at least three compounds of (A) a sulfur-containing organic compound having at least two active hydrogen atoms (hereinafter called "the compound (A)"), (B) a polyisocyanate compound having at least two isocyanate groups (hereinafter called "the compound (B)") and (C) an amine compound having at least two active hydrogen atoms (hereinafter called "the compound (C)") and then cationizing with an acid at least some of amino groups in a resultant reaction product.

In the present invention, it is preferred that a content of the amine compound (C) in the reaction product is from 5.5 to 18.5% in terms of molar percentage; that the acid is at least one of a phosphoric acid and a monovalent acid; that when the acid is a monovalent acid, the monovalent acid is a hydroxy acid; that the compound (A) contains at least one sulfide group in a molecule thereof; that the compound (A) has at least three active hydrogen atoms, at least one of which is contained in a hydroxyl group; and that the first antioxidant is at least one of compounds represented by the following formulas (1) to (6), respectively:

Formula (1)

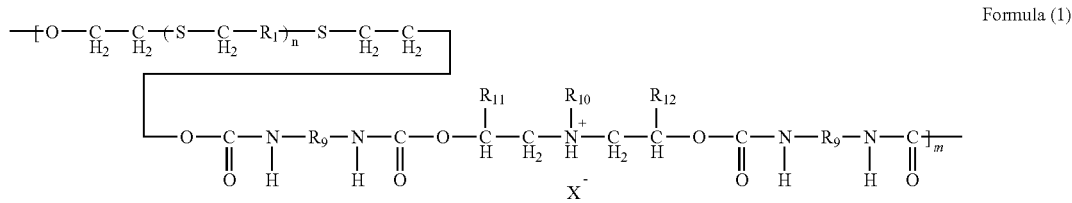

wherein n stands for 1 or 2, $R_1$ represents a methylene, ethylene or propylene group, $R_9$ represents an aliphatic hydrocarbon group containing at least one alkylene group or an aliphatic hydrocarbon group containing at least one hetroalicyclic or alicyclic group, $R_{10}$ represents an alkyl group having 1 to 4 carbon atoms, $R_{11}$ and $R_{12}$ each independently represents a hydrogen atom or a methyl group, $X^-$ represents an acid anion, and m stands for a number sufficient to give a weight average molecular weight of from 2,000 to 150,000;

Formula (2)

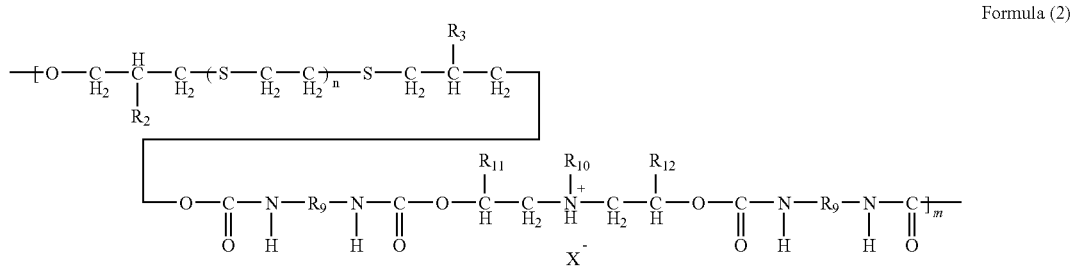

wherein n stands for 1 or 2, $R_2$ and $R_3$ each independently represents a hydrogen atom or a hydroxyl or alkyl group, $R_2$ and $R_3$ may be the same or different, and $R_9$ to $R_{12}$, $X^-$ and m have the same meanings as defined in Formula (1);

Formula (3)

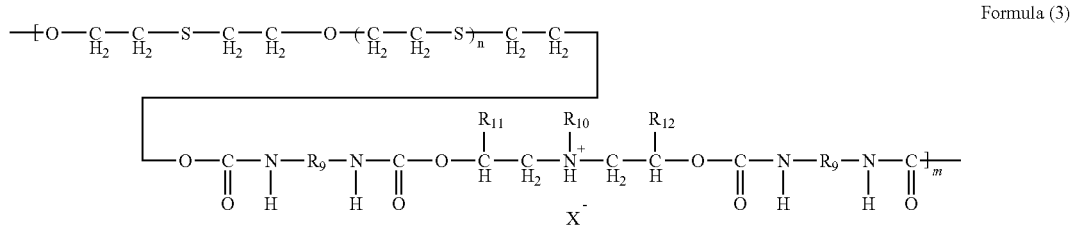

wherein n stands for 0 or 1, and $R_9$ to $R_{12}$, $X^-$ and m have the same meanings as defined in Formula (1);

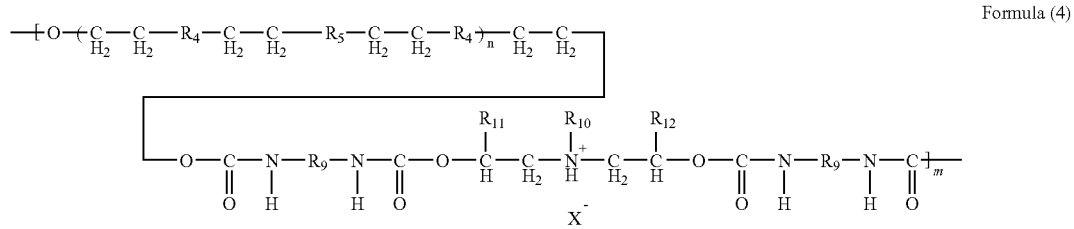

Formula (4)

wherein n stands for 1 or 2, $R_4$ represents a sulfur or oxygen atom, $R_5$ represents a sulfur atom or $-SO_2-$, $R_4$ and $R_5$ are not the same but are different, and $R_9$ to $R_{12}$, $X^-$ and m have the same meanings as defined in Formula (1);

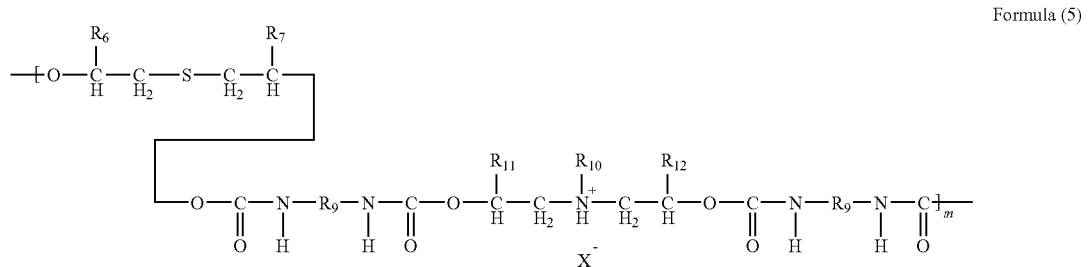

Formula (5)

wherein $R_6$ and $R_7$ each independently represents a hydrogen atom or an alkyl group, $R_6$ and $R_7$ may be the same or different, and $R_9$ to $R_{12}$, $X^-$ and m have the same meanings as defined in Formula (1); and

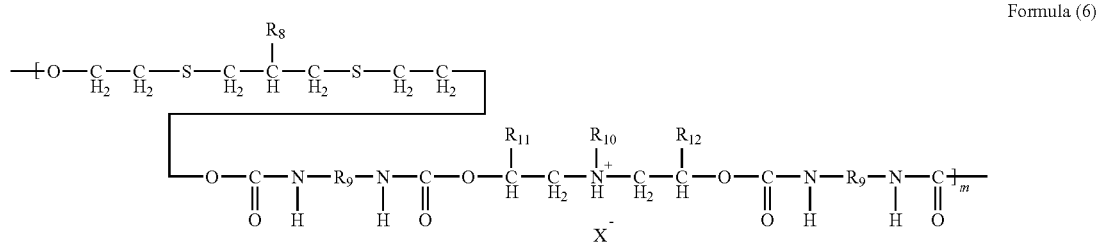

Formula (6)

wherein $R_8$ represents a hydroxyl or alkyl group, and $R_9$ to $R_{12}$, $X^-$ and m have the same meanings as defined in Formula (1).

The present invention also provides a recording medium provided on at least one side of a base material with at least one ink-receiving layer, wherein at least the ink-receiving layer contains the first antioxidant according to the present invention.

The present invention also provides a high-molecular antioxidant (hereinafter called "the second antioxidant") obtained by reacting at least three compounds of the compound (A), the compound (B) and a nonionic polyol compound having at least two active hydrogen atoms (hereinafter called "the compound (E)").

In the present invention as described above, it is preferred that the compound (A) contains at least one sulfide group in a molecule thereof; and that the compound (E) is polyethylene glycol.

The present invention also provides a recording medium provided on at least one side of a base material with at least one ink-receiving layer, wherein the ink-receiving layer contains the second antioxidant.

Advantageous Effects of the Invention

The recording media according to the present invention, which make use of the first and second antioxidants in at least ink-receiving layers thereof, respectively, can effectively prevent the discoloration or color fading of images, which are caused by acidic gas in the atmosphere and light, and also the migration of the images at high temperature and high humidity, and are suited for the long-term storage of images.

BEST MODES FOR CARRYING OUT THE INVENTION

The present invention will next be described in further detail based on preferred embodiments.

No particular limitation is imposed on the compound (A) for use in the synthesis of the first and second Antioxidants according to the present invention. However, preferred is a compound containing at least one sulfide group in a molecule thereof. Specific examples include compounds represented by the following formulas (7) to (12), respectively. In particular, the compounds represented by the formula (8) or formula (12) are highly effective for preventing the discoloration or color fading of images, which are caused by acidic gas in the atmosphere and light, and therefore, can be used preferably. The following compounds (A) can be used either solely or in combination at the same time to synthesize the first and second antioxidants according to the present invention.

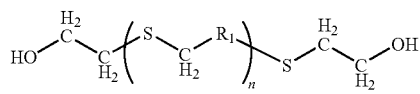

Formula (7)

wherein n stands for 1 or 2, and $R_1$ represents a methylene, ethylene or propylene group.

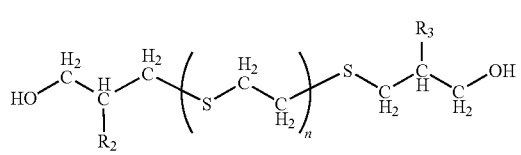

Formula (8)

wherein n stands for 1 or 2, $R_2$ and $R_3$ each independently represents a hydrogen atom or a hydroxyl or alkyl group, and $R_2$ and $R_3$ may be the same or different.

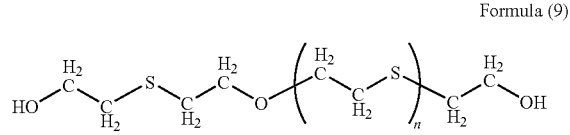

Formula (9)

wherein n stands for 0 or 1.

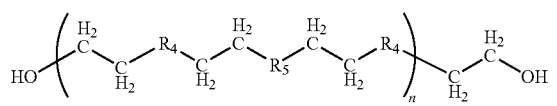

Formula (10)

wherein n stands for 1 or 2, $R_4$ represents a sulfur or oxygen atom, $R_5$ represents a sulfur atom or —$SO_2$—, and $R_4$ and $R_5$ are not the same but are different.

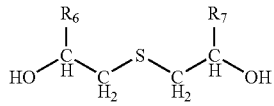

Formula (11)

wherein $R_6$ and $R_7$ each independently represents a hydrogen atom or an alkyl group, and $R_6$ and $R_7$ may be the same or different.

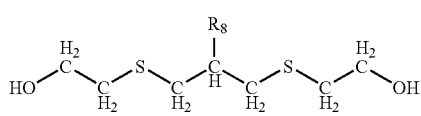

Formula (12)

wherein $R_8$ represents a hydroxyl or alkyl group.

Examples of the compound (B) for use in the synthesis of the first and second antioxidants according to the present invention include, but are not limited to, 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dichloro-4,4'-biphenylene diisocyanate, 1,5-naphthalene diisocyanate, 1,5-tetrahydronaphthalene diisocyanate, tetramethylene diisocyanate, 1,6-hexamethylene diisocyanate, dodecamethylene diisocyanate, trimethylhexamethylene diisocyanate, 1,3-cyclohexylene diisocyanate, 1,4-cyclohexylene diisocyanate, xylylene diisocyanate, tetramethylxylylene diisocyanate, hydrogenated xylylene diisocyanate, lysine diisocyanate, isophorone diisocyanate, and 4,4'-dicyclohexylmethane diisocyanate. These polyisocyanate compounds can be used either singly or in combination at the same time to synthesize the first and second antioxidants according to the present invention.

Preferred examples of the compound (C) for use in the synthesis of the first antioxidant according to the present invention include such tertiary amines as represented by the following formula (13):

Formula (13)

wherein any one of $R^1$, $R^2$ and $R^3$ represents an alkyl, alkanol or aminoalkyl group having 1 to 6 carbon atoms, and the remaining ones may be the same or different and each represents an alkanol, aminoalkyl or alkanethiol group.

Specific examples of the compound (C) represented by the formula (13) include, for example, as diol compounds, N-methyl-N,N-diethanolamine, N-ethyl-N,N-diethanolamine, N-isobutyl-N,N-diethanolamine, N-t-butyl-N,N-diethanolamine, and N-t-butyl-N,N-diisopropanolamine, and as a triol compound, triethanolamine. As diamine compounds, methyliminobispropylamine, butyliminobispropylamine and the like can be mentioned, and as a triamine compound, tri(2-aminoethyl)amine and the like can be mentioned. These amine compounds can be used either singly or in combination at the same time to synthesize the first antioxidant according to the present invention.

By reacting the compound (A), the compound (B) and the compound (C) as described above, the first antioxidant according to the present invention can be obtained as a high-molecular compound which contains in a molecule thereof units of the compound (A), units of the compound (B) and units of the compound (C) (with tertiary amines in these units having been cationized). To be effective as an antioxidant, the content of the compound (C) in the high-molecular compound can preferably be from 5.5 to 18.5% in terms of molar percentage. A content of the compound (C) lower than 5.5% in terms of molar percentage leads to a lower content of hydrophilic groups, so that inconvenience may be encountered upon preparation of a water dispersion of the antioxidant or the antioxidant may hardly be mixed in a water-based coating formulation upon formation of an ink-receiving layer with the antioxidant. A content of the compound (C) higher than 18.5% in terms of molar percentage, on the other hand, may develop such a problem that a recording medium with the antioxidant incorporated therein may be provided with reduced gloss and print density.

In the first antioxidant according to the present invention, the units of the compound (C) may account for from 3 to 80 wt. % of the first antioxidant insofar as the molar percentage of the compound (C) falls within the above-described range. A content of the units of the compound (C) higher than the above-mentioned range may induce a reduction in the function of the first antioxidant.

In the first antioxidant according to the present invention, the incorporated units of the compound (A) may preferably account for from 10 to 65 wt. % of the high-molecular compound insofar as the content of the compound (C) falls within the above-mentioned range. More preferably, the incorporated units of the compound (A) may account for from 30 to 65 wt. %. If the percentage which the units of the compound (A) account for from is lower than 10 wt. %, the first antioxidant may not be able to fully exhibit its effects in some instances. If the percentage which the units of the compound (A) account for exceeds 65 wt. %, on the other hand, the relative content of hydrophilic groups is lowered so that inconvenience may be encountered upon preparation of a water dispersion of the high-molecular compound.

Further, the compound (B) has a function to link the compound (A) and the compound (C). Although no particular limitation is imposed on the amount of the compound (B) to be used, the units of the compound (B) may preferably account for from 10 to 80 wt. % in the resulting high-molecular compound insofar as the content of the compound (C) falls within the above-mentioned range. More preferably, the units of the compound (B) may account for from 30 to 60 wt. %. Insofar as the percentage of the units of the compound (B) falls within this range, the units of the compound (A) and those of the compound (C) can be linked together in amounts sufficient to allow them to fully exhibit their functions.

The production process of the first antioxidant, which uses the above-described compounds (A), (B) and (C), can be a so-called one-shot process that the compounds (A) to (C) are reacted at once into a random polymer or a so-called prepolymer process that the compound (A) (or the compound (C)) and the compound (B) are reacted at an isocyanate-group-rich ratio to produce a prepolymer having terminal isocyanate groups and the prepolymer and the compound (C) (or the compound (A)) are then reacted. Whichever process is employed, a chain extender such as a low-molecular polyol or low-molecular diamine may be used in combination. The molecular weight of the resulting first antioxidant can be controlled by changing the amounts of the compounds (A), (B) and (C) to be used or adding a reaction terminator such as a monoalcohol or monoamine at an adequate timing to the reaction system.

The weight average molecular weight of the first antioxidant obtained as described above may be preferably in a range of from 2,000 to 150,000, more preferably in a range of from 2,000 to 50,000, although it varies depending upon the reaction conditions. A weight average molecular weight lower than 2,000 may lead to reductions in gloss and print density, whereas a weight average molecular weight higher than 150,000 results in a longer reaction time and increased production cost. Therefore, weight average molecular weights outside the above-described range are not preferred.

Upon production of the first antioxidant according to the present invention, the compound (D) other than the compound (A) or compound (C) may be copolymerized as needed. The first antioxidant for use in the present invention can also be synthesized by using, as such a compound (D), the following polyester polyols, polyether polyols or polycarbonate polyols either singly or in combination at the same time.

Examples of the polyester polyols are led by polyesters obtained through dehydrating condensation reactions from glycol components, such as ethylene glycol, propylene glycol, 1,3-propanediol, 1,4-butanediol, 1,5-pentanediol, 3-methyl-1,5-pentanediol, 1,6-hexanediol, neopentyl glycoldiol, diethylene glycol, triethylene glycol, tetraethylene glycol, polyethylene glycols having molecular weights of from 300 to 1,000, dipropylene glycol, tripropylene glycol, bishydroxyethoxybenzene, 1,4-cyclohexanedimethanol, bisphenol A, bisphenol S, hydrogenated bisphenol A, hydroquinone and alkylene oxide adducts, and acid components such as malonic acid, succinic acid, glutaric acid, adipic acid, pimelic acid, suberic acid, azelaic acid, sebacic acid, hendecanedicarboxylic acid, decanedicarboxylic acid, dodecanedicarboxylic acid, maleic anhydride, fumaric acid, 1,3-cyclopentanedicarboxylic acid, terephthalic acid, isophthalic acid, phthalic acid, 1,4-naphthalenedicarboxylic acid, 2,5-naphthalenedicarboxylic acid, 2,6-naphthalenedicarboxylic acid, naphthalic acid, bisphenyldicarboxylic acid, 1,2-bisphenoxyethane-p,p'-dicarboxylic acid, and anhydrides or ester-forming derivatives of dicarboxylic acids; and also include polyesters obtained by ring-opening polymerization reactions of cyclic ester compounds such as ε-caprolactone, and their copolymerized polyesters.

Examples of the polyether polyols include those obtained by addition-polymerizing compounds containing at least two active hydrogen atoms, such as ethylene glycol, diethylene glycol, triethylene glycol, propylene glycol, trimethylene glycol, 1,3-butanediol, 1,4-butanediol, 1,5-pentanediol, 1,6-hexanediol, neopentyl glycol, glycerin, trimethylolethane, trimethylolpropane, sorbitol, sucrose, bisphenol A, bisphenol S, hydrogenated bisphenol A, aconic acid, trimellitic acid, hemimellitic acid, phosphoric acid, ethylenediamine, diethylenetriamine, triisopropanolamine, pyrogallol, dihydroxybenzoic acid, hydroxyphthalic acid and 1,2,3-propanetrithiol, in a manner known per se in the art while using as an initiator one or more monomers such as ethylene oxide, propylene oxide, butylene oxide, styrene oxide, epichlorohydrin, tetrahydrofuran and/or cyclohexylene. Particularly preferred is polyethylene glycol.

Examples of the polycarbonate polyols include compounds obtained by reactions of glycols, such as 1,4-butanediol, 1,6-hexanediol and diethylene glycol, and diphenyl carbonate and phosgene.

Concerning the first antioxidant according to the present invention, it is desired to use a tin-based catalyst and/or an amine-based catalyst in the isocyanate polyaddition reaction. Examples of the tin-based catalyst include, but are not limited to, dibutyltin dilaurate and stannous octoate, and examples of the amine-based catalyst include, but are not limited to, triethylenediamine, triethylamine, tetramethylpropanediamine, tetramethylbutanediamine, and N-methylmorpholine.

Depending upon the composition, the isocyanate polyaddition reaction can be conducted under solventless conditions. It is, however, a common practice to use as a reaction solvent a hydrophilic organic solvent, which does not take direct part in the isocyanate polyaddition reaction system, for suppressing the reaction or controlling the base viscosity in the reaction system. Examples of such a hydrophilic organic solvent include ketones such as acetone, methyl ethyl ketone, methyl isobutyl ketone and diisobutyl ketone; organic acid esters such as methyl formate, ethyl formate, propyl formate, butyl formate, methyl acetate, ethyl acetate, propyl acetate, butyl acetate, methyl propionate, ethyl propionate and butyl propionate; and amines such as N,N-dimethylformamide and N-methylpyrrolidone. It is preferred to finally remove the used hydrophilic organic solvent.

The first antioxidant according to the present invention can be stably dispersed or dissolved in water by cationizing at least some of the units of the compound (C) with the acid. If cationized with a quaternization agent such as an alkyl halogenide as a different method, the first antioxidant cannot be stably dispersed or dissolved with a preferred particle size in water. No particular limitation is imposed on the acid for use in the above-described cationization. Use of a phosphoric acid and/or a monovalent acid is, however, preferred because use of a polyvalent acid causes viscosity to increase upon dispersing or dissolving the first antioxidant according to the present invention in water. Examples of the phosphoric acid include phosphoric acid and phosphorous acid, and examples of the monovalent acid include organic acids such as formic acid, acetic acid, propionic acid, butyric acid, glycolic acid, lactic acid, pyruvic acid and methanesulfonic acid; and inorganic acids such as hydrochloric acid and nitric acid. An antioxidant cationized with a hydroxy acid can be used more preferably because, when it is used in the formation of an ink-receiving layer of a recording medium, the yellowing of non-printed areas (blank areas) can be reduced compared with the use of an antioxidant cationized with another acid.

Among first antioxidants (high-molecular compounds) of the present invention available by such processes as described above, particularly preferred ones can be represented by the following formulas (1) to (6), respectively. It is to be noted that n, $R_1$ to $R_{12}$, $X^-$ and m in the formulas have the same meanings as described above.

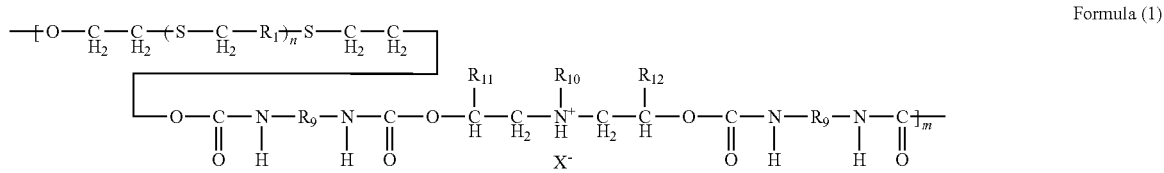

Formula (1)

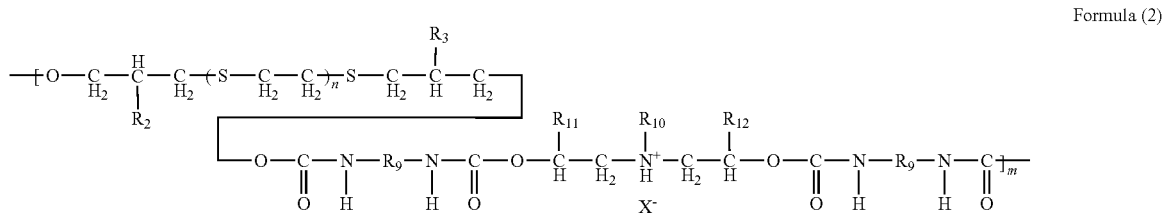

Formula (2)

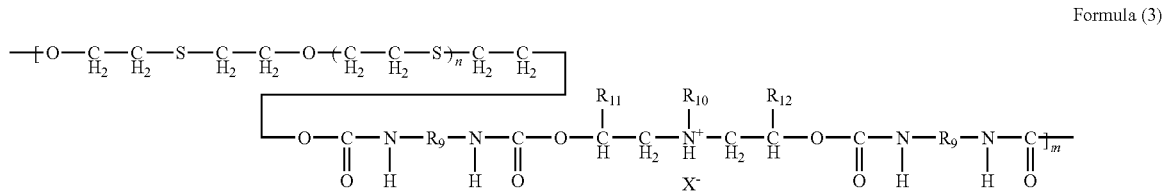

Formula (3)

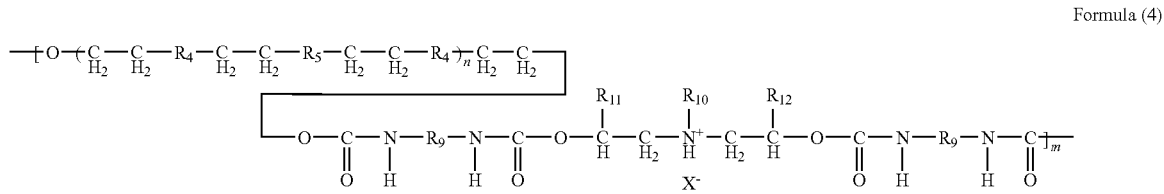

Formula (4)

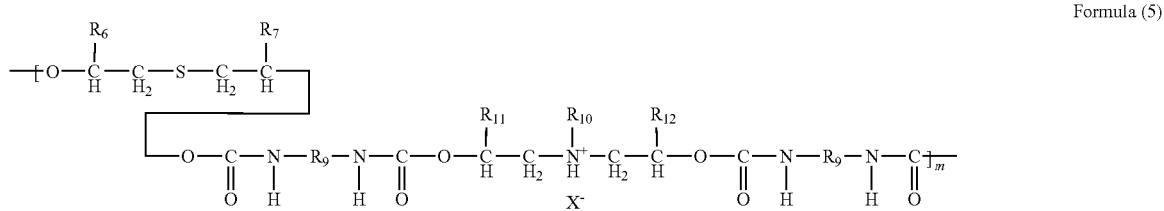

Formula (5)

-continued

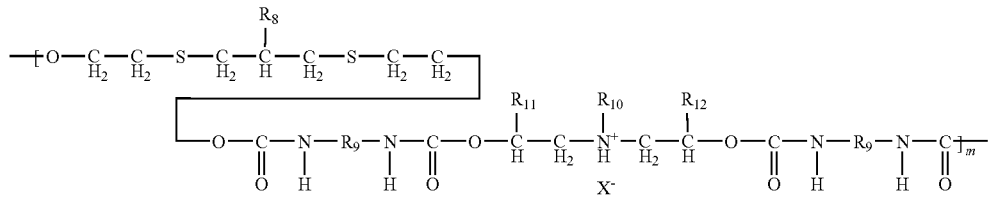

Formula (6)

By reacting the compound (A), the compound (E) (specifically, polyethylene glycol) and the compound (B), the second antioxidant according to the present invention can be obtained as a high-molecular compound which contains in a molecule thereof units of the compound (A), units of the compound (E) and units of the compound (B). To be effective as an antioxidant, the weight of the compound (A) incorporated in the high-molecular compound may preferably account for from 10 to 70 wt. % of the high-molecular compound. A percentage that accounts for 20 to 60 wt. % is more preferred. At a percentage of the units of the compound (A) lower than 10 wt. %, the effects as an antioxidant may not be fully brought about. A percentage of the units of the compound (A) greater than 70 wt. %, on the other hand, leads to a relative reduction in the content of hydrophilic groups, and therefore, may become inconvenient upon preparation of a water dispersion of the second antioxidant.

As the compound (E), the units derived from at least polyethylene glycol may preferably account for from 3 to 80 wt. % of the high-molecular compound. A percentage of from 10 to 50 wt. % is more preferred. At a percentage of the units of polyethylene glycol smaller than 3 wt. %, the resulting antioxidant is not provided with sufficient hydrophilicity so that in some instances, its mixing in a water-based coating formulation may become difficult upon forming an ink-receiving layer with the antioxidant. A percentage of the units of polyethylene glycol greater than 80 wt. % leads to a reduction in the percentage of the units of the compound (A) so that the resulting antioxidant may not be equipped with a sufficient antioxidant function, and in some instances, such a low percentage of the units of polyethylene glycol may become inconvenient in gas fastness and the like. The second antioxidant may contain units of one or more further compounds insofar as the percentage of the units of polyethylene glycol fall within the above range.

Further, the compound (B) has a function to link the compound (A) and the compound (E). Although no particular limitation is imposed on the amount of the compound (B) to be used, the units of the compound (B) may preferably account for from 10 to 80 wt. %. More preferably, the units of the compound (B) may account for from 30 to 60 wt. %. Insofar as the percentage of the units of the compound (B) falls within this range, the units of the compound (A) and those of the compound (E) can be linked together in amounts sufficient to allow them to fully exhibit their functions.

The production process of the second antioxidant can be a so-called one-shot process that the compounds (A), (B) and (E) are reacted at once into a random polymer or a so-called prepolymer process that the compound (A) (or the compound (E)) and the compound (B) are reacted at an isocyanate-group-rich ratio to produce a prepolymer having terminal isocyanate groups and the prepolymer and the compound (E) (or the compound (A)) are then reacted. Whichever process is employed, a chain extender such as a low-molecular polyol or low-molecular diamine may be used in combination. The molecular weight of the resulting second antioxidant can be controlled by changing the amount of the compound (B) to be used or adding a reaction terminator such as water, a monoalcohol or a monoamine at an adequate timing to the reaction system. The weight average molecular weight of the second antioxidant obtained as described above may be preferably in a range of from 2,000 to 150,000, although it varies depending upon the reaction conditions.

When the first or second antioxidant (hereinafter collectively called "the antioxidant") according to the present invention is dispersed in an aqueous medium, the average particle size of the dispersoid may preferably be in a range of from 5 nm to 500 nm from the viewpoint of storage stability. The term "average particle size" as used herein means an average particle size as measured by the dynamic light scattering method and determined from an analysis that makes use of the cumulant method described in "Polymer Structure (2), Scattering Experiments and Form Observations, Chapter 1 Light Scattering" (Kyoritsu Shuppan Co., Ltd.; Edited by the Society of Polymer Science, Japan) or J. Chem. Phys., 70(B), 15Apl., 3965 (1979). According to the dynamic light scattering method, there is a distribution in decays of the time correlation function from light scattering where fine particles having different particle sizes exist together. By analyzing the time correlation function in accordance with the cumulant method, a mean ($<\Gamma>$) and dispersion ($\mu$) of the decay rate can be determined. As the decay rate ($\Gamma$) can be expressed in terms of a function of a diffusion coefficient and scattering vector of particles, the hydrodynamic average particle size can be determined using the Stokes-Einstein equation. Each average particle size as defined herein can be readily measured by using, for example, "LASER DIFFRACTION PARTICLE SIZE ANALYZER PARIII" (manufactured by OTSUKA ELECTRONICS CO., LTD.).

The recording medium according to the present invention is characterized in that its ink-receiving layer contains the above-described antioxidant of the present invention. The formation of the ink-receiving layer can be conducted by applying a coating formulation, in which a suitable binder and an appropriate inorganic pigment are dispersed or dissolved in a water-based solvent, onto a surface of an adequate base material and then drying the coating formulation. In the present invention, the ink-receiving layer can be obtained by forming it with the coating formulation with the antioxidant of the present invention dissolved or dispersed therein or by forming an ink-receiving layer with an antioxidant-free, coating formulation and then impregnating the ink-receiving layer with the antioxidant of the present invention by a suitable method, for example, by a method such as overcoating.

The content of the antioxidant of the present invention in the ink-receiving layer may preferably be from 0.05 wt. % to 20 wt. % in terms of solid content based on the ink-receiving layer. Insofar as the content falls within this range, it is possible to effectively prevent the color fading or discoloration of images by gas in the atmosphere and light and the migration of the images at high temperature and high humidity. A content lower than 0.05 wt. % based on the ink-receiving layer cannot fully achieve the prevention of color fading and discoloration of images by gas and light, that is, the object of the present invention. A content higher than 20 wt. %, on the other hand, has potential problems in that the ink absorbability may be deteriorated; the effect for the prevention of the migration of images at high temperature and high humidity may be reduced; and the print density may be lowered.

As the base material for the recording medium in the present invention, paper such as high-quality paper, medium-quality paper, coated paper, art paper or cast-coated paper, synthetic paper, a white plastic film, a transparent plastic film, a translucent film, resin-coated paper, or the like can be used, although no particular limitation is imposed on the base material.

To effectively obtain glossy images, a base material having high barrier property to a coating formulation, which is used to form an ink-receiving layer, is preferred. Suited are white plastic films such as polyethylene terephthalate, polyvinyl chloride, polycarbonates, polyimides, polyacetates, polyethylene, polypropylene and polystyrene films opacified by mixing a pigment such as titanium oxide or barium sulfate or by making them porous; and so-called resin-coated paper formed by laminating base paper with a thermoplastic resin such as polyethylene or polypropylene. To effectively obtain semi-glossy images, resin-coated paper obtained by performing matting or embossing upon lamination of the thermoplastic resin can be used preferably.

When it is desired to provide a recording medium with similar image quality and hand feeling as high-gloss silver halide photographs, a paper material which is used most preferably as a base material can be polyolefin-resin coated paper coated with a polyolefin resin on at least one side thereof on which an ink-receiving layer is arranged, with polyolefin-resin coated paper coated on both sides thereof being more preferred. As a preferred form of the polyolefin-resin-coated paper, its 10-point average roughness as defined in JIS-B0601 is not greater than 0.5 μm, and its 60-deg. specular gloss as defined in JIS-Z-8741 is from 25 to 75%.

The thickness of the resin-coated paper may preferably be from 25 μm to 500 μm although no particular limitation is imposed in this respect. A thickness smaller than 25 μm may develop such inconvenience that the resulting inkjet recording sheet may be low in stiffness; and, when taken in hand, may give a reduced touch feel and texture; or that the resulting inkjet recording sheet is provided with reduced opacity. A thickness greater than 500 μm, on the other hand, leads to a stiff inkjet recording sheet with reduced handling ease, and therefore, may become a cause of the development of a trouble when the inkjet recording sheet is fed to and caused to run in a printer or the like. A more preferred range is from 50 μm to 300 μm. The weight of the resin-coated paper may preferably be in a range of from 25 g/m$^2$ to 500 g/m$^2$ although no particular limitation is imposed in this respect.

When paper such as high-quality paper is used as a base material, the use of one having a Stoeckigt sizing degree of 15 seconds or greater, more desirably 25 seconds or greater is preferred to obtain good color-developing ability and resolution. As a still further example, a sheet made of glass or metal may also be used. Corona discharge treatment or one or more of various undercoating treatments can also be applied to improve the adhesion strength between such a base material and the ink-receiving layer associated with it.

As an inorganic pigment usable in the present invention, it is preferably in the form of such fine particles that has high ink-absorbing capacity, is excellent in color-developing ability, and can form images of high quality. Examples of such an inorganic pigment include synthetic amorphous silica, colloidal silica, calcium carbonate, magnesium carbonate, kaolin, clay, talc, hydrotalsite, aluminum silicate, calcium silicate, magnesium silicate, synthetic amorphous silica, colloidal silica, diatomaceous earth, alumina, alumina hydrates, colloidal alumina, aluminum hydroxide, alumina hydrates of the boehmite structure, alumina hydrates of the pseudo-boehmite structure, lithopone, and zeolite. They can be used either singly or in combination.

As the form of the above-described inorganic pigment, its average particle size may be preferably in a range of from 50 nm to 500 nm, more preferably in a range of from 100 nm to 300 nm to obtain an ink-receiving layer of high gloss and high transparency. If the average particle size of the inorganic pigment is smaller than 50 nm, the resulting ink-receiving layer is provided with significantly-lowered ink-absorbing capacity so that, when printed by a printer of high ejection rate, ink migration and/or beading (the troublesome formation of non-uniform density spots due to a failure in absorbing inks) occurs. An average particle size greater than 500 nm results in an ink-receiving layer of lowered transparency or leads to images of lowered print density and gloss.

Among the above-exemplified inorganic pigments, those which can be used especially preferably are alumina hydrates of the boehmite structure and alumina hydrates of the pseudo-boehmite structure. These inorganic pigments are especially high in ink-absorbing capacity, excellent in color-developing ability, and is capable of forming high-quality images.

In particular, alumina, alumina hydrates of the boehmite structure and alumina hydrates of the pseudo-boehmite structure having a BET specific surface area of 50 m$^2$/g or greater are preferred. The BET specific surface area is more preferably in a range of from 50 to 500 m$^2$/g, still more preferably in a range of from 50 to 250 m$^2$/g. When the BET specific surface area of an alumina hydrate is in a above range, the resulting ink-receiving layer is excellent in ink-absorbing capacity, beading resistance, smoothness and the like. A BET specific surface are a smaller than 50 m$^2$/g, on the other hand, results in an ink-receiving layer having lowered transparency and print density, so that the resulting print tends to present images as if they are covered by a white haze. Further, a BET specific surface area greater than 500 m$^2$/g is not preferred either because the resulting ink-receiving layer is provided with lowered ink-absorbing ability or a great deal of an acid is required as a deflocculant to stably disperse the alumina hydrate.

Alumina hydrates of the boehmite structure or the pseudo-boehmite structure, which can be preferably used in the present invention, are represented by the following formula (14):

$$Al_2O_{3-n}(OH)_{2n} \cdot mH_2O \qquad \text{Formula (14)}$$

wherein n stands for any one of integers 0, 1, 2 and 3, and m stands for 0 to 10, preferably a value of from 0 to 5. As mH$_2$O represents a removable water phase which takes no part in the formation of a crystal lattice in many instances, m can take a value which is not an integer. When an alumina hydrate of this kind is calcined, m may reach a value of 0.

An alumina hydrate which shows the boehmite structure is generally a layer compound, the (020) plane of a crystal of which forms a huge plane so that a characteristic diffraction peak appears in its X-ray diffraction pattern. As the boehmite structure, it is possible to take, in addition to the complete boehmite structure, a structure called "pseudo-boehmite" that extra water is contained between layers of (020) planes. An X-ray diffraction pattern of this pseudo-boehmite shows a broader diffraction peak than complete boehmite. As complete boehmite and pseudo-boehmite cannot be clearly distinguished from each other, both of them will hereinafter be called "an alumina hydrate showing the boehmite structure" unless otherwise specifically indicated.

No particular limitation is imposed on the production process of the alumina hydrate, and therefore, any process can be adopted, for example, such as the Bayer process or the alum pyrolysis process. A particularly preferred process is a process that adds an acid to a long-chain aluminum alkoxide to hydrolyze it. The particle form of the thus-obtained alumina hydrate can be controlled to a specific range by controlling the conditions for an aging step in which particles are allowed to grow subsequent to a hydrothermal synthesis step. Adequate control of the aging time allows the growth of primary particles of the alumina hydrate with a relatively uniform particle size. By adding an acid as a deflocculant, a sol obtained here can be used as it is as a dispersion. To make a further improvement in the dispersibility of the alumina hydrate in water, however, it is also possible to form the sol into a powder by a method such as spray drying and then to add an acid to the powder to provide a dispersion. As the acid that deflocculates the alumina hydrate, a conventionally-known acid can be used. Illustrative are organic acids such as formic acid, acetic acid, propionic acid, butyric acid, glycolic acid, lactic acid, pyruvic acid and methanesulfonic acid; and inorganic acids such as hydrochloric acid and nitric acid. From these exemplified acids, one or more acids can be selected and used as desired.

In the present invention, a water-soluble resin and/or a water-dispersible resin can be used together with the inorganic pigment to form an ink-receiving layer. Examples of the water-soluble resin or water-dispersible resin usable in the present invention include gelatin, casein and its modified products; cellulose derivatives such as methylcellulose, carboxymethylcellulose and hydroxyethylcellulose; completely or partially-saponified polyvinyl alcohol and its modified products (cation-modified products, anion-modified products, silanol-modified products, etc.); urea resins, melamine resins, epoxy resins, epichlorohydrin resins, polyurethane resins, polyethyleneimine resins, polyamide resins, polyvinylpyrrolidone resins, polyvinyl butyral resins, poly(meth) acrylic acid resins and copolymers thereof, acrylamide resins, maleic anhydride-based copolymers, polyester resins; SBR latex, NBR latex, methylmethacrylate-butadiene copolymer latex, acrylic polymer latexes such as acrylate ester copolymers, vinyl polymer latexes such as ethylene-vinyl acetate copolymer, and functional-group-modified polymer latexes obtained by incorporating cationic groups or anionic groups in these various polymer latexes. Preferred is polyvinyl alcohol obtained by hydrolyzing polyvinyl acetate and having an average polymerization degree of from 300 to 5,000. Its saponification degree may be preferably from 70 to lower than 100%, especially preferably form 80 to 99.5%. These water-soluble or water-dispersible resins can be used either singly or in combination.

The mixing weight ratio of the inorganic pigment (A) to the water-soluble resin and/or water-dispersible resin (B) may be preferably in a range of A:B=1:1 to 30:1, more preferably in a range of A:B=1.5:1 to 20:1. Insofar as the amount of the water-soluble resin and/or water-dispersible resin falls within these ranges, the resulting ink-receiving layer hardly undergoes crazing or separation as dust and is also good in ink-absorbing capacity.

In the recording medium according to the present invention, a hardener may be incorporated in its ink-receiving layer to improve the film formability, water resistance and film strength of a film formed by the fine inorganic particles and the water-soluble or water-dispersible resin. In general, the hardener can be selected from various hardeners depending upon the kind of reactive groups contained in the polymer to be used. In the case of a polyvinyl alcohol resin, for example, an epoxy-based hardener, a boron compound such as boric acid, or an inorganic hardener such as a water-soluble aluminum salt can be mentioned.

The amount of the boron compound to be used varies depending upon the amount of the water-soluble resin and/or water-dispersible resin to be used as a binder. In general, however, it is desired to add the boron compound in a proportion of from 0.1 to 30 wt. % base on the water-soluble resin and/or water-dispersible resin. A content of the boron compound lower than 0.1 wt. % based on the water-soluble resin and/or water-dispersible resin leads to a reduction in film formability, thereby making it impossible to obtain sufficient water resistance. Conversely, a content higher than 30 wt. % results in a coating formulation the viscosity of which changes considerably with time, so that the coating stability is lowered.

As the construction of the recording medium according to the present invention, it is possible to choose inter alia a construction that one or more ink-receiving layers, each of which contains at least one antioxidant of the present invention, are arranged on a base material; a construction that a coating formulation with the antioxidant contained therein has been overcoated on an ink-receiving layer; or a construction that a very small amount of a coating formulation, which contains at least one antioxidant of the present invention, has been applied on a surface of a base material to form an ink-receiving layer. It is to be noted that the present invention also encompasses these constructions as "those each having an ink-receiving layer formed on a surface of a base material".

The solid concentration of the coating formulation for the formation of the ink-receiving layer may preferably be from 5 to 50 wt. % based on the whole weight of the coating formulation, although no particular limitation is imposed on the solid concentration in so far as the coating formulation is equipped with such a viscosity as permitting the formation of the ink-receiving layer on the base material. A solid concentration lower than 5 wt. % is required to increase the amount to be coated to provide the resulting ink-receiving layer with a greater thickness. As a longer time and greater energy are required for drying, such a low solid concentration may become uneconomical in some instances. A solid concentration higher than 50 wt. %, on the other hand, provide the coating formulation with a high viscosity so that the coating applicability may be reduced.

In the above-described coating formulation, a variety of additives can be mixed to extent not impairing the effects of the present invention. Such additives include surfactants, pigment dispersants, thickeners, crosslinking agents, defoaming agents, ink fixing agents, dot adjusters, colorants, fluorescent whitening agents, preservatives, pH adjusters, antistatic agents, and conducting agents.

As a method for coating the thus-prepared coating formulation onto a base material, a conventionally-known, desired coating method can be applied. For example, the coating can be performed by a coating method such as blade coating, air-knife coating, curtain-die coating, slot-die coating, bar coating, gravure coating or roll coating. Using a dryer such as a hot air dryer, hot drum or far infrared dryer, the base material with the coating formulation coated thereon can then be dried to form an ink-receiving layer. The ink-receiving layer may be formed by changing the proportions of the alumina hydrate, resin and other additives. The base material can be provided on one side thereof with such an ink-receiving layer, or can be provided one both sides thereof with such ink-receiving layers, respectively. To make improvements in the resolution of images and transportability, smoothing processing may be conducted using a machine such as a calender or a cast.

The coat weight of the coating formulation onto the base material may be preferably in a range of from 0.5 to 60 g/m$^2$, more preferably in a range of from 5 to 55 g/m$^2$ in terms of solid content. A coat weight smaller than 0.5 g/m$^2$ results in an ink-receiving layer, which cannot absorb the water of inks sufficiently so that the inks may run or images may migrate. A coat weight greater than 60 g/m$^2$, on the other hand, may develop curling during drying or may fail to exhibit effects to such pronounced extent as expected in printing performance.

It is not clear why the recording medium making use of the antioxidant of the present invention as described above can avoid color fading or discoloration of images, which are caused by gas and light. Presumably, however, this may be attributed to the inhibition of production of radicals or peroxide in the ink-receiving layer by the antioxidant. As a reason for the prevention of the migration of images at high temperature and high humidity, it is presumed that the number of hydroxyl groups contained in the compound (A) and compound (C), which constitute the antioxidant, has substantially decreased as a result of the formation into the high molecular compound; and their inherent hygroscopic property has been reduced.

No particular limitation is imposed on the inks to be used upon performing recording with the recording medium according to the present invention. It is, however, preferred to use general water-based inks for inkjet recording, which employ dyes or pigments as colorants and use a mixture of water and a water-soluble organic solvent as a medium to dissolve or disperse the dyes or pigments.

As a method for performing the formation of images by applying the above-described inks onto the recording medium, inkjet recording is particularly suited. Any inkjet recording technique can be applied insofar as it can effectively eject the inks from nozzles and apply them onto the recording medium. In particular, the inkjet recording technique disclosed in JP-A-54-059936, etc. can be effectively used. According to this inkjet recording technique, each ink subjected to the action of heat energy undergoes an abrupt volume change, and under an acting force produced by this change in state, the ink is then ejected from the corresponding nozzle.

EXAMPLES

The present invention will hereinafter be described specifically based on examples. It is to be note that in the following examples, the "parts", "part" and "%" are on a weight basis unless otherwise specifically indicated.

Production of Alumina Hydrate

By the process disclosed in U.S. Pat. No. 4,242,271, aluminum dodexide was produced. Following the process disclosed in U.S. Pat. No. 4,202,870, the aluminum dodexide was then hydrolyzed to produce an alumina slurry. Water was then added to the alumina slurry until the solid content of alumina hydrate having the boehmite structure dropped to 7.7%. The pH of the alumina slurry was 9.4. A 3.9% solution of nitric acid was added to adjust the pH.

Using an autoclave, aging was then conducted at a pre-aging pH of 6.0 and an aging temperature of 150° C. for an aging time of 6 hours to obtain a colloidal sol. That colloidal sol was spray-dried into an alumina hydrate powder at an inlet temperature of 87° C. The thus-obtained powder was an alumina hydrate, the particle shape and crystalline structure of which were platy and the boehmite structure, respectively. The alumina hydrate of the boehmite structure was then mixed to 20% in deionized water to produce a dispersion of the alumina hydrate.

Using an ultrasonic homogenizer ("UH-600S", manufactured by SMT Co., Ltd.), the dispersion obtained by the above-described procedure was re-dispersed to prepare a 20% dispersion of the alumina hydrate. The average particle size of the alumina hydrate in the thus-obtained dispersion was measured using "Laser Diffraction Particle Size Analyzer PARIII" (manufactured by OTSUKA ELECTRONICS CO., LTD.). As a result, the average particle size was 165.5 nm.

Examples of the First Antioxidant

Production Procedure for an Antioxidant 1

An antioxidant 1 was produced as will be described below.

Into a reaction vessel equipped with a stirrer, thermometer and reflux condenser, acetone (140 g) was charged as a reaction solvent. After 3,6-dithia-1,8-octanediol (50.00 g) and methyldiethanolamine (10.46 g) were dissolved under stirring, the solution was heated to 40° C. at which isophorone diisocyanate (79.66 g) was added. The resulting mixture was then heated to 50° C., followed by the addition of a tin-based catalyst (0.4 g). The thus-obtained mixture was heated further to 55° C., at which a reaction was conducted for 4 hours under stirring.

Subsequent to the completion of the reaction, the reaction mixture was cooled to room temperature and 35% hydrochloric acid (9.14 g) was added to effect cationization. After water (573 g) was added further, the resulting mixture was concentrated under reduced pressure to remove acetone. The concentrate was adjusted with water to produce, as the antioxidant 1, a water dispersion of an antioxidant according to the present invention, the solid content of which was 20%.

Production Procedure for an Antioxidant 2

An antioxidant 2 was produced as will be described below.

Into a reaction vessel equipped with a stirrer, thermometer and reflux condenser, acetone (98 g) was charged as a reaction solvent. After 3,6-dithia-1,8-octanediol (40.00 g) and methyldiethanolamine (3.50 g) were dissolved under stirring, the solution was heated to 40° C. at which isophorone diisocyanate (55.02 g) was added. The resulting mixture was then heated to 50° C., followed by the addition of a tin-based catalyst (0.2 g). The thus-obtained mixture was heated further to 55° C., at which a reaction was conducted for 4 hours under stirring.

Subsequent to the completion of the reaction, the reaction mixture was cooled to room temperature and 85% formic acid (1.56 g) was added to effect cationization. After water (404 g) was added further, a 20% water dispersion of an antioxidant according to the present invention was produced as the antioxidant 2 in a similar manner as in the production procedure for the antioxidant 1.

Production Procedure for an Antioxidant 3

An antioxidant 3 was produced as will be described below.

Into a reaction vessel equipped with a stirrer, thermometer and reflux condenser, acetone (109 g) was charged as a reaction solvent. After 3,6-dithia-1,8-octanediol (40.00 g) and methyldiethanolamine (6.79 g) were dissolved under stirring, the solution was heated to 40° C. at which isophorone diisocyanate (62.07 g) was added. The resulting mixture was then heated to 50° C., followed by the addition of a tin-based catalyst (0.2 g). The thus-obtained mixture was heated further to 55° C., at which a reaction was conducted for 4 hours under stirring.

Subsequent to the completion of the reaction, the reaction mixture was cooled to room temperature and 85% formic acid (3.09 g) was added to effect cationization. After water (446 g) was added further, a water dispersion of an antioxidant according to the present invention, the solid content of which was 20%, was produced as the antioxidant 3 in a similar manner as in the production procedure for the antioxidant 1.

Production Procedure for an Antioxidant 4

An antioxidant 4 was produced as will be described below.

Into a reaction vessel equipped with a stirrer, thermometer and reflux condenser, acetone (128 g) was charged as a reaction solvent. After 3,6-dithia-1,8-octanediol (40.00 g) and methyldiethanolamine (14.56 g) were dissolved under stirring, the solution was heated to 40° C. at which isophorone diisocyanate (73.25 g) was added. The resulting mixture was then heated to 50° C., followed by the addition of a tin-based catalyst (0.2 g). The thus-obtained mixture was heated further to 55° C., at which a reaction was conducted for 4 hours under stirring.

Subsequent to the completion of the reaction, the reaction mixture was cooled to room temperature and 85% formic acid (5.24 g) was added to effect cationization. After water (523 g) was added further, a water dispersion of an antioxidant according to the present invention, the solid content of which was 20%, was produced as the antioxidant 4 in a similar manner as in the production procedure for the antioxidant 1.

Production Procedure for an Antioxidant 5

An antioxidant 5 was produced as will be described below.

Into a reaction vessel equipped with a stirrer, thermometer and reflux condenser, acetone (161 g) was charged as a reaction solvent. After 3,6-dithia-1,8-octanediol (50.00 g) and methyldiethanolamine (17.83 g) were dissolved under stirring, the solution was heated to 40° C. at which isophoronediisocyanate (93.29 g) was added. The resulting mixture was then heated to 50° C., followed by the addition of a tin-based catalyst (0.4 g). The thus-obtained mixture was heated further to 55° C., at which a reaction was conducted for 3 hours under stirring.

Subsequent to the completion of the reaction, the reaction mixture was cooled to room temperature and 98% acetic acid (8.98 g) was added to effect cationization. After water (680 g) was added further, a water dispersion of an antioxidant according to the present invention, the solid content of which was 20%, was produced as the antioxidant 5 in a similar manner as in the production procedure for the antioxidant 1.

Production Procedure for an Antioxidant 6

An antioxidant 6 was produced as will be described below.

Into a reaction vessel equipped with a stirrer, thermometer and reflux condenser, acetone (111 g) was charged as a reaction solvent. After 3,6-dithia-1,8-octanediol (40.00 g) and methyldiethanolamine (8.15 g) were dissolved under stirring, the solution was heated to 40° C. at which isophorone diisocyanate (63.64 g) was added. The resulting mixture was then heated to 50° C., followed by the addition of a tin-based catalyst (0.4 g). The thus-obtained mixture was heated further to 55° C., at which a reaction was conducted for 4 hours under stirring.

Subsequent to the completion of the reaction, the reaction mixture was cooled to room temperature and 85% phosphoric acid (7.88 g) was added to effect cationization. After water (470 g) was added further, a water dispersion of an antioxidant according to the present invention, the solid content of which was 20%, was produced as the antioxidant 6 in a similar manner as in the production procedure for the antioxidant 1.

Production Procedure for an Antioxidant 7

An antioxidant 7 was produced as will be described below.

Into a reaction vessel equipped with a stirrer, thermometer and reflux condenser, acetone (73 g) was charged as a reaction solvent. After 3,6-dithia-1,8-octanediol (30.00 g) and t-butyldiethanolamine (3.32 g) were dissolved under stirring, the solution was heated to 40° C. at which isophorone diisocyanate (40.52 g) was added. The resulting mixture was then heated to 50° C., followed by the addition of a tin-based catalyst (0.4 g). The thus-obtained mixture was heated further to 55° C., at which a reaction was conducted for 5 hours under stirring.

Subsequent to the completion of the reaction, the reaction mixture was cooled to room temperature and 35% hydrochloric acid (2.13 g) was added to effect cationization. After water (301 g) was added further, a water dispersion of an antioxidant according to the present invention, the solid content of which was 20%, was produced as the antioxidant 7 in a similar manner as in the production procedure for the antioxidant 1.

Production Procedure for an Antioxidant 8

An antioxidant 8 was produced as will be described below.

Into a reaction vessel equipped with a stirrer, thermometer and reflux condenser, acetone (81 g) was charged as a reaction solvent. After 3,6-dithia-1,8-octanediol (30.00 g) and t-butyldiethanolamine (6.98 g) were dissolved under stirring, the solution was heated to 40° C. at which isophorone diisocyanate (44.28 g) was added. The resulting mixture was then heated to 50° C., followed by the addition of a tin-based catalyst (0.4 g). The thus-obtained mixture was heated further to 55° C., at which a reaction was conducted for 5 hours under stirring.

Subsequent to the completion of the reaction, the reaction mixture was cooled to room temperature and 35% hydrochloric acid (4.51 g) was added to effect cationization. After water (331 g) was added further, a water dispersion of an antioxidant according to the present invention, the solid content of which was 20%, was produced as the antioxidant 8 in a similar manner as in the production procedure for the antioxidant 1.

Production Procedure for an Antioxidant 9

An antioxidant 9 was produced as will be described below.

Into a reaction vessel equipped with a stirrer, thermometer and reflux condenser, acetone (99 g) was charged as a reaction solvent. After 3,6-dithia-1,8-octanediol (30.00 g) and t-butyldiethanolamine (14.52 g) were dissolved under stirring, the solution was heated to 40° C. at which isophorone diisocyanate (54.62 g) was added. The resulting mixture was then heated to 50° C., followed by the addition of a tin-based catalyst (0.4 g). The thus-obtained mixture was heated further to 55° C., at which a reaction was conducted for 5 hours under stirring.

Subsequent to the completion of the reaction, the reaction mixture was cooled to room temperature and 35% hydrochloric acid (9.34 g) was added to effect cationization. After water (404 g) was added further, a water dispersion of an antioxidant according to the present invention, the solid content of which was 20%, was produced as the antioxidant 9 in a similar manner as in the production procedure for the antioxidant 1.

Production Procedure for an Antioxidant 10

An antioxidant 10 was produced as will be described below.

Into a reaction vessel equipped with a stirrer, thermometer and reflux condenser, acetone (139 g) was charged as a reaction solvent. After 3,6-dithia-1,8-octanediol (50.00 g) and t-butyldiethanolamine (12.06 g) were dissolved under stirring, the solution was heated to 40° C. at which isophorone diisocyanate (76.80 g) was added. The resulting mixture was then heated to 50° C., followed by the addition of a tin-based catalyst (0.4 g). The thus-obtained mixture was heated further to 55° C., at which a reaction was conducted for 5 hours under stirring.

Subsequent to the completion of the reaction, the reaction mixture was cooled to room temperature and 85% phosphoric acid (8.62 g) was added to effect cationization. After water (585 g) was added further, a water dispersion of an antioxidant according to the present invention, the solid content of which was 20%, was produced as the antioxidant 10 in a similar manner as in the production procedure for the antioxidant 1.

Production Procedure for an Antioxidant 11

An antioxidant 11 was produced as will be described below.

Into a reaction vessel equipped with a stirrer, thermometer and reflux condenser, acetone (110 g) was charged as a reaction solvent. After 3,6-dithia-1,8-octanediol (40.00 g) and t-butyldiethanolamine (9.29 g) were dissolved under stirring, the solution was heated to 40° C. at which isophorone diisocyanate (60.36 g) was added. The resulting mixture was then heated to 50° C., followed by the addition of a tin-based catalyst (0.4 g). The thus-obtained mixture was heated further to 55° C., at which a reaction was conducted for 5 hours under stirring.

Subsequent to the completion of the reaction, the reaction mixture was cooled to room temperature and 85% formic acid (3.20 g) was added to effect cationization. After water (449 g) was added further, a water dispersion of an antioxidant according to the present invention, the solid content of which was 20%, was produced as the antioxidant 11 in a similar manner as in the production procedure for the antioxidant 1.

Production Procedure for an Antioxidant 12

An antioxidant 12 was produced as will be described below.

Into a reaction vessel equipped with a stirrer, thermometer and reflux condenser, acetone (127 g) was charged as a reaction solvent. After 3,6-dithia-1,8-octanediol (50.00 g) and t-butyldipropanolamine (7.85 g) were dissolved under stirring, the solution was heated to 40° C. at which isophoronediisocyanate (69.47 g) was added. The resulting mixture was then heated to 50° C., followed by the addition of a tin-based catalyst (0.4 g). The thus-obtained mixture was heated further to 55° C., at which a reaction was conducted for 7 hours under stirring.

Subsequent to the completion of the reaction, the reaction mixture was cooled to room temperature and 35% hydrochloric acid (4.32 g) was added to effect cationization. After water (515 g) was added further, a water dispersion of an antioxidant according to the present invention, the solid content of which was 20%, was produced as the antioxidant 12 in a similar manner as in the production procedure for the antioxidant 1.

Production Procedure for an Antioxidant 13

An antioxidant 13 was produced as will be described below.

Into a reaction vessel equipped with a stirrer, thermometer and reflux condenser, acetone (105 g) was charged as a reaction solvent. After 3,6-dithia-1,8-octanediol (40.00 g) and t-butyldipropanolamine (7.82 g) were dissolved under stirring, the solution was heated to 40° C. at which isophoronediisocyanate (57.38 g) was added. The resulting mixture was then heated to 50° C., followed by the addition of a tin-based catalyst (0.4 g). The thus-obtained mixture was heated further to 55° C., at which a reaction was conducted for 7 hours under stirring.

Subsequent to the completion of the reaction, the reaction mixture was cooled to room temperature and 85% formic acid (2.24 g) was added to effect cationization. After water (428 g) was added further, a water dispersion of an antioxidant according to the present invention, the solid content of which was 20%, was produced as the antioxidant 13 in a similar manner as in the production procedure for the antioxidant 1.

Production Procedure for an Antioxidant 14

An antioxidant 14 was produced as will be described below.

Into a reaction vessel equipped with a stirrer, thermometer and reflux condenser, acetone (111 g) was charged as a reaction solvent. After 3,6-dithia-1,8-octanediol (40.00 g) and t-butyldiethanolamine (9.52 g) were dissolved under stirring, the solution was heated to 40° C. at which isophoronediisocyanate (61.28 g) was added. The resulting mixture was then heated to 50° C., followed by the addition of a tin-based catalyst (0.3 g). The thus-obtained mixture was heated further to 55° C., at which a reaction was conducted for 4 hours under stirring.

Subsequent to the completion of the reaction, the reaction mixture was cooled to room temperature and a 50% aqueous solution of glucolic acid (8.98 g) was added to effect cationization. After water (461 g) was added further, a water dispersion of an antioxidant according to the present invention, the solid content of which was 20%, was produced as the antioxidant 14 in a similar manner as in the production procedure for the antioxidant 1.

Production Procedure for an Antioxidant 15

An antioxidant 15 was produced as will be described below.

Into a reaction vessel equipped with a stirrer, thermometer and reflux condenser, acetone (111 g) was charged as a reaction solvent. After 3,6-dithia-1,8-octanediol (40.00 g) and t-butyldiethanolamine (9.65 g) were dissolved under stirring, the solution was heated to 40° C. at which isophorone diisocyanate (61.44 g) was added. The resulting mixture was then heated to 50° C., followed by the addition of a tin-based catalyst (0.3 g). The thus-obtained mixture was heated further to 55° C., at which a reaction was conducted for 4 hours under stirring.

Subsequent to the completion of the reaction, the reaction mixture was cooled to room temperature and 98% pyruvic acid (5.27 g) was added to effect cationization. After water (465 g) was added further, a water dispersion of an antioxidant according to the present invention, the solid content of which was 20%, was produced as the antioxidant 15 in a similar manner as in the production procedure for the antioxidant 1.

Production Procedure for an Antioxidant 16

An antioxidant 16 was produced as will be described below.

Into a reaction vessel equipped with a stirrer, thermometer and reflux condenser, acetone (234 g) was charged as a reaction solvent. After 5-hydroxy-3,7-dithia-1,9-nonanediol (40.00 g) and methyldiethanolamine (6.29 g) were dissolved under stirring, the solution was heated to 40° C. at which isophorone diisocyanate (54.17 g) was added. The resulting mixture was then heated to 50° C., followed by the addition of a tin-based catalyst (0.1 g). The thus-obtained mixture was heated further to 55° C., at which a reaction was conducted for 2 hours under stirring.

Subsequent to the completion of the reaction, the reaction mixture was cooled to room temperature and 35% hydrochloric acid (5.50 g) was added to effect cationization. After water (410 g) was added further, a water dispersion of an antioxidant according to the present invention, the solid content of which was 20%, was produced as the antioxidant 16 in a similar manner as in the production procedure for the antioxidant 1.

Production Procedure for an Antioxidant 17

An antioxidant 17 was produced as will be described below.

Into a reaction vessel equipped with a stirrer, thermometer and reflux condenser, acetone (239 g) was charged as a reaction solvent. After 5-hydroxy-3,7-dithia-1,9-nonanediol (40.00 g) and methyldiethanolamine (3.02 g) were dissolved under stirring, the solution was heated to 40° C. at which isophorone diisocyanate (49.84 g) was added. The resulting mixture was then heated to 50° C., followed by the addition of a tin-based catalyst (0.1 g). The thus-obtained mixture was heated further to 55° C., at which a reaction was conducted for 2 hours under stirring.

Subsequent to the completion of the reaction, the reaction mixture was cooled to room temperature and 85% formic acid (1.38 g) was added to effect cationization. After water (381 g) was added further, a water dispersion of an antioxidant according to the present invention, the solid content of which was 20%, was produced as the antioxidant 17 in a similar manner as in the production procedure for the antioxidant 1.

Production Procedure for an Antioxidant 18

An antioxidant 18 was produced as will be described below.

Into a reaction vessel equipped with a stirrer, thermometer and reflux condenser, acetone (258 g) was charged as a reaction solvent. After 5-hydroxy-3,7-dithia-1,9-nonanediol (40.00 g) and methyldiethanolamine (6.29 g) were dissolved under stirring, the solution was heated to 40° C. at which isophorone diisocyanate (54.17 g) was added. The resulting mixture was then heated to 50° C., followed by the addition of a tin-based catalyst (0.1 g). The thus-obtained mixture was heated further to 55° C., at which a reaction was conducted for 2 hours under stirring.

Subsequent to the completion of the reaction, the reaction mixture was cooled to room temperature and 85% formic acid (2.86 g) was added to effect cationization. After water (412 g) was added further, a water dispersion of an antioxidant according to the present invention, the solid content of which was 20%, was produced as the antioxidant 18 in a similar manner as in the production procedure for the antioxidant 1.

Production Procedure for an Antioxidant 19

An antioxidant 19 was produced as will be described below.

Into a reaction vessel equipped with a stirrer, thermometer and reflux condenser, acetone (295 g) was charged as a reaction solvent. After 5-hydroxy-3,7-dithia-1,9-nonanediol (40.00 g) and methyldiethanolamine (12.24 g) were dissolved under stirring, the solution was heated to 40° C. at which isophorone diisocyanate (62.56 g) was added. The resulting mixture was then heated to 50° C., followed by the addition of a tin-based catalyst (0.1 g). The thus-obtained mixture was heated further to 55° C., at which a reaction was conducted for 2 hours under stirring.

Subsequent to the completion of the reaction, the reaction mixture was cooled to room temperature and 85% formic acid (5.54 g) was added to effect cationization. After water (470 g) was added further, a water dispersion of an antioxidant according to the present invention, the solid content of which was 20%, was produced as the antioxidant 19 in a similar manner as in the production procedure for the antioxidant 1.

Production Procedure for an Antioxidant 20

An antioxidant 20 was produced as will be described below.

Into a reaction vessel equipped with a stirrer, thermometer and reflux condenser, acetone (334 g) was charged as a reaction solvent. After 5-hydroxy-3,7-dithia-1,9-nonanediol (40.00 g) and t-butyldiethanolamine (8.62 g) were dissolved under stirring, the solution was heated to 40° C. at which isophorone diisocyanate (53.20 g) was added. The resulting mixture was then heated to 50° C., followed by the addition of a tin-based catalyst (0.1 g). The thus-obtained mixture was heated further to 55° C., at which a reaction was conducted for 5 hours under stirring.

Subsequent to the completion of the reaction, the reaction mixture was cooled to room temperature and 35% hydrochloric acid (5.57 g) was added to effect cationization. After water (415 g) was added further, a water dispersion of an antioxidant according to the present invention, the solid content of which was 20%, was produced as the antioxidant 20 in a similar manner as in the production procedure for the antioxidant 1.

Production Procedure for an Antioxidant 21

An antioxidant 21 was produced as will be described below.

Into a reaction vessel equipped with a stirrer, thermometer and reflux condenser, acetone (102 g) was charged as a reaction solvent. After 2,2-thiodiethanol (30.00 g) and methyldiethanolamine (6.36 g) were dissolved under stirring, the solution was heated to 40° C. at which isophorone diisocyanate (65.84 g) was added. The resulting mixture was then heated to 50° C., followed by the addition of a tin-based catalyst (0.4 g). The thus-obtained mixture was heated further to 55° C., at which a reaction was conducted for 4 hours under stirring.

Subsequent to the completion of the reaction, the reaction mixture was cooled to room temperature and 35% hydrochloric acid (5.56 g) was added to effect cationization. After water (417 g) was added further, a water dispersion of an antioxidant according to the present invention, the solid content of which was 20%, was produced as the antioxidant 21 in a similar manner as in the production procedure for the antioxidant 1.

Production Procedure for an Antioxidant 22

An antioxidant 22 was produced as will be described below.

Into a reaction vessel equipped with a stirrer, thermometer and reflux condenser, acetone (106 g) was charged as a reaction solvent. After 2,2-thiodiethanol (30.00 g) and t-butyldiethanolamine (8.94 g) were dissolved under stirring, the solution was heated to 40° C. at which isophorone diisocyanate (67.48 g) was added. The resulting mixture was then heated to 50° C., followed by the addition of a tin-based catalyst (0.2 g). The thus-obtained mixture was heated further to 55° C., at which a reaction was conducted for 5 hours under stirring.

Subsequent to the completion of the reaction, the reaction mixture was cooled to room temperature and 35% hydrochloric acid (5.77 g) was added to effect cationization. After water (434 g) was added further, a water dispersion of an antioxidant according to the present invention, the solid content of which was 20%, was produced as the antioxidant 22 in a similar manner as in the production procedure for the antioxidant 1.

Production Procedure for an Antioxidant 23

An antioxidant 23 was produced as will be described below.

Into a reaction vessel equipped with a stirrer, thermometer and reflux condenser, acetone (134 g) was charged as a reaction solvent. After 2,2-thiodiethanol (40.00 g) and t-butyldipropanolamine (9.91 g) were dissolved under stirring, the solution was heated to 40° C. at which isophorone diisocyanate (83.68 g) was added. The resulting mixture was then heated to 50° C., followed by the addition of a tin-based catalyst (0.4 g). The thus-obtained mixture was heated further to 55° C., at which a reaction was conducted for 6 hours under stirring.

Subsequent to the completion of the reaction, the reaction mixture was cooled to room temperature and 35% hydrochloric acid (5.48 g) was added to effect cationization. After water (544 g) was added further, a water dispersion of an antioxidant according to the present invention, the solid content of which was 20%, was produced as the antioxidant 23 in a similar manner as in the production procedure for the antioxidant 1.

Production Procedure for an Antioxidant 24

An antioxidant 24 was produced as will be described below.

Into a reaction vessel equipped with a stirrer, thermometer and reflux condenser, acetone (47 g) was charged as a reaction solvent. After 6-oxa-3,9-dithia-1,11-undecanediol (22.00 g) and methyldiethanolamine (3.60 g) were dissolved under stirring, the solution was heated to 40° C. at which isophorone diisocyanate (27.00 g) was added. The resulting mixture was then heated to 50° C., followed by the addition of a tin-based catalyst (0.1 g). The thus-obtained mixture was heated further to 55° C., at which a reaction was conducted for 4 hours under stirring.

Subsequent to the completion of the reaction, the reaction mixture was cooled to room temperature and 35% hydrochloric acid (3.20 g) was added to effect cationization. After water (215 g) was added further, a water dispersion of an antioxidant according to the present invention, the solid content of which was 20%, was produced as the antioxidant 24 in a similar manner as in the production procedure for the antioxidant 1.

Production Procedure for an Antioxidant 25

An antioxidant 25 was produced as will be described below.

Into a reaction vessel equipped with a stirrer, thermometer and reflux condenser, acetone (240 g) was charged as a reaction solvent. After 1,2-bis(2,3-dihydroxypropylthio)ethane (40.00 g) and methyldiethanolamine (5.76 g) were dissolved under stirring, the solution was heated to 40° C. at which isophorone diisocyanate (47.53 g) was added. The resulting mixture was then heated to 50° C., followed by the addition of a tin-based catalyst (0.1 g). The thus-obtained mixture was heated further to 55° C., at which a reaction was conducted for 2 hours under stirring.

Subsequent to the completion of the reaction, the reaction mixture was cooled to room temperature and 35% hydrochloric acid (5.03 g) was added to effect cationization. After water (380 g) was added further, a water dispersion of an antioxidant according to the present invention, the solid content of which was 20%, was produced as the antioxidant 25 in a similar manner as in the production procedure for the antioxidant 1.

Production Procedure for an Antioxidant 26

An antioxidant 26 was produced as will be described below.

Into a reaction vessel equipped with a stirrer, thermometer and reflux condenser, acetone (66 g) was charged as a reaction solvent. After bis(2-(2-hydroxyethylthio)ethyl)sulfone (30.00 g) and methyldiethanolamine (4.25 g) were dissolved under stirring, the solution was heated to 40° C. at which isophorone diisocyanate (32.25 g) was added. The resulting mixture was then heated to 5° C., followed by the addition of a tin-based catalyst (0.1 g). The thus-obtained mixture was heated further to 55° C., at which a reaction was conducted for 4 hours under stirring.

Subsequent to the completion of the reaction, the reaction mixture was cooled to room temperature and 35% hydrochloric acid (3.71 g) was added to effect cationization. After water (271 g) was added further, a water dispersion of an antioxidant according to the present invention, the solid content of which was 20%, was produced as the antioxidant 26 in a similar manner as in the production procedure for the antioxidant 1.

Production Procedure for an Antioxidant 27

An antioxidant 27 was produced as will be described below.

Into a reaction vessel equipped with a stirrer, thermometer and reflux condenser, acetone (116 g) was charged as a reaction solvent. After 1-(2-hydroxyethylthio)propan-2-ol (10.22 g), 3,6-dithia-1,8-octanediol (30.00 g) and t-butyldiethanolamine (9.76 g) were dissolved under stirring, the solution was heated to 40° C. at which isophorone diisocyanate (66.10 g) was added. The resulting mixture was then heated to 50° C., followed by the addition of a tin-based catalyst (0.4 g). The thus-obtained mixture was heated further to 55° C., at which a reaction was conducted for 5 hours under stirring.

Subsequent to the completion of the reaction, the reaction mixture was cooled to room temperature and 35% hydrochloric acid (6.32 g) was added to effect cationization. After water (473 g) was added further, a water dispersion of an antioxidant according to the present invention, the solid content of which was 20%, was produced as the antioxidant 27 in a similar manner as in the production procedure for the antioxidant 1.

Production Procedure for an Antioxidant 28

An antioxidant 28 was produced as will be described below.

Into a reaction vessel equipped with a stirrer, thermometer and reflux condenser, acetone (81 g) was charged as a reaction solvent. After 3,6-dithia-1,8-octanediol (35.00 g), methyldiethanolamine (6.20 g), polyethylene glycol monomethyl ether (molecular weight: 1,500; 3.00 g) and trimethylolpropane-PO adduct (molecular weight: 2,000; 0.6 g) were dissolved under stirring, the solution was heated to 40° C. at which isophoronediisocyanate (55.00 g) was added. The resulting mixture was then heated to 50° C., followed by the addition of a tin-based catalyst (0.03 g). The thus-obtained mixture was heated further to 55° C., at which a reaction was conducted for 5 hours under stirring.

Subsequent to the completion of the reaction, the reaction mixture was cooled to room temperature and 35% hydrochloric acid (5.40 g) was added to effect cationization. After water (407 g) was added further, a water dispersion of an antioxidant according to the present invention, the solid content of which was 20%, was produced as the antioxidant 28 in a similar manner as in the production procedure for the antioxidant 1.

Production Procedure for an Antioxidant 29

An antioxidant 29 was produced as will be described below.

Into a reaction vessel equipped with a stirrer, thermometer and reflux condenser, acetone (226 g) was charged as a reaction solvent. After 3,6-dithia-1,8-octanediol (40.00 g), t-butyldiethanolamine (9.46 g) and polyethylene glycol (molecular weight: 1,000; 1.40 g) were dissolved under stirring, the solution was heated to 40° C. at which isophorone diisocyanate (61.51 g) was added. The resulting mixture was then heated to 50° C., followed by the addition of a tin-based catalyst (0.4 g). The thus-obtained mixture was heated further to 55° C., at which a reaction was conducted for 4 hours under stirring.

Subsequent to the completion of the reaction, the reaction mixture was cooled to room temperature and 35% hydrochloric acid (6.11 g) was added to effect cationization. After water (460 g) was added further, a water dispersion of an antioxidant according to the present invention, the solid content of which was 20%, was produced as the antioxidant 29 in a similar manner as in the production procedure for the antioxidant 1.

Production Procedure for an Antioxidant 30

An antioxidant 30 was produced as will be described below.

Into a reaction vessel equipped with a stirrer, thermometer and reflux condenser, acetone (100 g) was charged as a reaction solvent. After 3,6-dithia-1,8-octanediol (40.00 g) and methyldiethanolamine (2.99 g) were dissolved under stirring, the solution was heated to 40° C. at which isophorone diisocyanate (57.08 g) was added. The resulting mixture was then heated to 50° C., followed by the addition of a tin-based catalyst (0.2 g). The thus-obtained mixture was heated further to 55° C., at which a reaction was conducted for 4 hours under stirring.

Subsequent to the completion of the reaction, the reaction mixture was cooled to room temperature and 85% formic acid (1.36 g) was added to effect cationization. After water (410 g) was added further, a water dispersion of an antioxidant (antioxidant 30) according to the present invention, the solid content of which was 20%, was produced in a similar manner as in the production procedure for the antioxidant 1. However, the water dispersion had poor dispersion properties, and settling took place in a minute.

Production Procedure for an Antioxidant 31

An antioxidant 31 was produced as will be described below.

Into a reaction vessel equipped with a stirrer, thermometer and reflux condenser, acetone (94 g) was charged as a reaction solvent. After 3,6-dithia-1,8-octanediol (30.00 g) and methyldiethanolamine (11.50 g) were dissolved under stirring, the solution was heated to 40° C. at which isophoronediisocyanate (52.68 g) was added. The resulting mixture was then heated to 50° C., followed by the addition of a tin-based catalyst (0.2 g). The thus-obtained mixture was heated further to 55° C., at which a reaction was conducted for 4 hours under stirring.

Subsequent to the completion of the reaction, the reaction mixture was cooled to room temperature and 85% formic acid (5.24 g) was added to effect cationization. After water (386 g) was added further, a water dispersion of an antioxidant according to the present invention, the solid content of which was 20%, was produced as the antioxidant 31 in a similar manner as in the production procedure for the antioxidant 1.

Production Procedure for an Antioxidant 32

An antioxidant 32 was produced as will be described below.

Into a reaction vessel equipped with a stirrer, thermometer and reflux condenser, acetone (70 g) was charged as a reaction solvent. After 3,6-dithia-1,8-octanediol (30.00 g) and t-butyldiethanolamine (2.54 g) were dissolved under stirring, the solution was heated to 40° C. at which isophorone diisocyanate (38.00 g) was added. The resulting mixture was then heated to 50° C., followed by the addition of a tin-based catalyst (0.4 g). The thus-obtained mixture was heated further to 55° C., at which a reaction was conducted for 5 hours under stirring.

Subsequent to the completion of the reaction, the reaction mixture was cooled to room temperature and 35% hydrochloric acid (1.66 g) was added to effect cationization. After water (288 g) was added further, a water dispersion of an antioxidant (antioxidant 32) according to the present invention, the solid content of which was 20%, was produced in a similar manner as in the production procedure for the antioxidant 1. However, the water dispersion had poor dispersion properties; and settling took place in a minute.

Production Procedure for an Antioxidant 33

An antioxidant 33 was produced as will be described below.

Into a reaction vessel equipped with a stirrer, thermometer and reflux condenser, acetone (95 g) was charged as a reaction solvent. After 3,6-dithia-1,8-octanediol (29.00 g) and t-butyldiethanolamine (15.95 g) were dissolved under stirring, the solution was heated to 40° C. at which isophorone diisocyanate (50.08 g) was added. The resulting mixture was then heated to 50° C., followed by the addition of a tin-based catalyst (0.4 g). The thus-obtained mixture was heated further to 55° C., at which a reaction was conducted for 5 hours under stirring.

Subsequent to the completion of the reaction, the reaction mixture was cooled to room temperature and 35% hydrochloric acid (10.26 g) was added to effect cationization. After water (388 g) was added further, a water dispersion of an antioxidant according to the present invention, the solid content of which was 20%, was produced as the antioxidant 33 in a similar manner as in the production procedure for the antioxidant 1.

Production Procedure for an Antioxidant 34

An antioxidant 34 was produced as will be described below.

Into a reaction vessel equipped with a stirrer, thermometer and reflux condenser, acetone (230 g) was charged as a reaction solvent. After 5-hydroxy-3,7-dithia-1,9-nonanediol (40.00 g) and methyldiethanolamine (2.49 g) were dissolved under stirring, the solution was heated to 40° C. at which isophorone diisocyanate (47.06 g) was added. The resulting mixture was then heated to 50° C., followed by the addition of a tin-based catalyst (0.1 g). The thus-obtained mixture was heated further to 55° C., at which a reaction was conducted for 2 hours under stirring.

Subsequent to the completion of the reaction, the reaction mixture was cooled to room temperature and 85% formic acid (1.13 g) was added to effect cationization. After water (367 g) was added further, a water dispersion of an antioxidant (antioxidant 34) according to the present invention, the solid content of which was 20%, was produced in a similar manner as in the production procedure for the antioxidant 1. However, the water dispersion had poor dispersion properties; and settling took place in a minute.

Production Procedure for an Antioxidant 35

An antioxidant 35 was produced as will be described below.

Into a reaction vessel equipped with a stirrer, thermometer and reflux condenser, acetone (288 g) was charged as a reaction solvent. After 5-hydroxy-3,7-dithia-1,9-nonanediol (40.00 g) and methyldiethanolamine (13.35 g) were dissolved under stirring, the solution was heated to 40° C. at which isophorone diisocyanate (58.65 g) was added. The resulting mixture was then heated to 50° C., followed by the addition of a tin-based catalyst (0.1 g). The thus-obtained mixture was heated further to 55° C., at which a reaction was conducted for 2 hours under stirring.

Subsequent to the completion of the reaction, the reaction mixture was cooled to room temperature and 85% formic acid (6.06 g) was added to effect cationization. After water (459 g) was added further, a water dispersion of an antioxidant according to the present invention, the solid content of which was 20%, was produced as the antioxidant 35 in a similar manner as in the production procedure for the antioxidant 1.

The synthesis components for the antioxidants 1 to 35 and their molar percentages are shown in Table 1. In Table 2, their weight average molecular weights and molecular weight distributions (Mw/Mn) as measured by GPC (Gel Permeation Chromatography; controller: "SC8010", detector: "RI8012", manufactured by TOSOH CORPORATION) are shown. As characteristic absorptions of urethane group, that is, C=O stretching vibrations at 1730-1690 $cm^{-1}$, N—H bending vibrations around 1540 $cm^{-1}$ and N—H stretching vibrations at 3450-3300 $cm^{-1}$ were observed by "FT/IR5300" (manufactured by JASCO Corporation), it has been confirmed that in each reaction, polymerization took place and the components were formed into a high-molecular compound.

TABLE 1

A List of Synthesized Antioxidants

| Anti-oxidant | Compound (A) | | Compound (B) | | Compound (C) | | Acid |
|---|---|---|---|---|---|---|---|
| | Compound name | Mole % | Compound name | Mole % | Compound name | Mole % | |
| 1 | 3,6-Dithia-1,8-octanediol | 38.1 | Isophorone diisocyanate | 49.7 | Methyldiethanolamine | 12.2 | Hydrochloric acid |
| 2 | 3,6-Dithia-1,8-octanediol | 44.2 | Isophorone diisocyanate | 49.9 | Methyldiethanolamine | 5.9 | Formic acid |
| 3 | 3,6-Dithia-1,8-octanediol | 39.5 | Isophorone diisocyanate | 50.3 | Methyldiethanolamine | 10.3 | Formic acid |
| 4 | 3,6-Dithia-1,8-octanediol | 32.7 | Isophorone diisocyanate | 49.1 | Methyldiethanolamine | 18.2 | Formic acid |
| 5 | 3,6-Dithia-1,8-octanediol | 32.5 | Isophorone diisocyanate | 49.8 | Methyldiethanolamine | 17.7 | Acetic acid |
| 6 | 3,6-Dithia-1,8-octanediol | 38.2 | Isophorone diisocyanate | 49.9 | Methyldiethanolamine | 11.9 | Phosphoric acid |

TABLE 1-continued

A List of Synthesized Antioxidants

| | | | | | | | | |
|---|---|---|---|---|---|---|---|---|
| 7 | 3,6-Dithia-1,8-octanediol | 44.8 | Isophorone diisocyanate | 49.6 | t-Butyldiethanolamine | 5.6 | Hydrochloric acid |
| 8 | 3,6-Dithia-1,8-octanediol | 40.4 | Isophorone diisocyanate | 48.9 | t-Butyldiethanolamine | 10.6 | Hydrochloric acid |
| 9 | 3,6-Dithia-1,8-octanediol | 32.9 | Isophorone diisocyanate | 49.1 | t-Butyldiethanolamine | 18.0 | Hydrochloric acid |
| 10 | 3,6-Dithia-1,8-octanediol | 39.5 | Isophorone diisocyanate | 49.7 | t-Butyldiethanolamine | 10.8 | Phosphoric acid |
| 11 | 3,6-Dithia-1,8-octanediol | 40.0 | Isophorone diisocyanate | 49.5 | t-Butyldiethanolamine | 10.5 | Formic acid |
| 12 | 3,6-Dithia-1,8-octanediol | 43.7 | Isophorone diisocyanate | 49.7 | t-Butyldipropanolamine | 6.6 | Hydrochloric acid |
| 13 | 3,6-Dithia-1,8-octanediol | 42.3 | Isophorone diisocyanate | 49.8 | t-Butyldiproanolamine | 8.0 | Formic acid |
| 14 | 3,6-Dithia-1,8-octanediol | 39.6 | Isophorone diisocyanate | 49.7 | t-Butyldiethanolamine | 10.7 | Glycolic acid |
| 15 | 3,6-Dithia-1,8-octanediol | 39.5 | Isophorone diisocyanate | 49.7 | t-Butyldiethanolamine | 10.8 | Pyruvic acid |
| 16 | 5-Hydroxy-3,7-dithia-1,9-nonanediol | 39.5 | Isophorone diisocyanate | 49.4 | Methyldiethanolamine | 11.1 | Hydrochloric acid |
| 17 | 5-Hydroxy-3,7-dithia-1,9-nonanediol | 43.7 | Isophorone diisocyanate | 50.4 | Methyldiethanolamine | 5.9 | Formic acid |
| 18 | 5-Hydroxy-3,7-dithia-1,9-nonanediol | 38.9 | Isophorone diisocyanate | 50.3 | Methyldiethanolamine | 10.9 | Formic acid |
| 19 | 5-Hydroxy-3,7-dithia-1,9-nonanediol | 32.9 | Isophorone diisocyanate | 49.2 | Methyldiethanolamine | 17.9 | Formic acid |
| 20 | 5-Hydroxy-3,7-dithia-1,9-nonanediol | 39.2 | Isophorone diisocyanate | 49.7 | t-Butyldiethanolamine | 11.1 | Hydrochloric acid |
| 21 | 2,2-Thiodiethanol | 41.3 | Isophorone diisocyanate | 49.8 | Methyldiethanolamine | 9.0 | Hydrochloric acid |
| 22 | 2,2-Thiodiethanol | 40.6 | Isophorone diisocyanate | 50.2 | t-Butyldiethanolamine | 9.2 | Hydrochloric acid |
| 23 | 2,2-Thiodiethanol | 43.3 | Isophorone diisocyanate | 49.8 | t-Butyldipropanolamine | 6.9 | Hydrochloric acid |
| 24 | 6-Oxa-3,9-dithia-1,11-undecanediol | 39.1 | Isophorone diisocyanate | 48.8 | Methyldiethanolamine | 12.1 | Hydrochloric acid |
| 25 | 1,2-Bis(2,3-dihydroxy-propylthio)ethane | 38.6 | Isophorone diisocyanate | 50.1 | Methyldiethanolamine | 11.3 | Hydrochloric acid |

| Anti-oxidant | Compound (A) | | Compound (B) | | Compound (C) | | Compound (D) | | Acid |
|---|---|---|---|---|---|---|---|---|---|
| | Compound name | Mole % | Compound name | Mole % | Compound name | Mole % | Compound name | Mole % | |
| 26 | Bis (2-(2-hydroxyethyl-thioethyl))-sulfone | 37.7 | Isophorone diisocyanate | 50.0 | Methyl-diethanolamine | 12.3 | — | — | Hydrochloric acid |
| 27 | 1-(2-Hydroxy-ethylthio)-propan-2-ol | 12.5 | Isophorone diisocyanate | 49.9 | t-Butyl-diethanolamine | 10.1 | — | — | Hydrochloric acid |
| | 3,6-Dithia-1,8-octanediol | 27.5 | | | | | | | |
| 28 | 3,6-Dithia-1,8-octanediol | 38.9 | Isophorone diisocyanate | 50.1 | Methyl-diethanolamine | 10.5 | PEGMME TMP-PO | 0.4 0.1 | Hydrochloric acid |
| 29 | 3,6-Dithia-1,8-octanediol | 39.4 | Isophorone diisocyanate | 49.8 | t-Butyl-diethanolamine | 10.5 | PEG | 0.3 | Hydrochloric acid |
| 30 | 3,6-Dithia-1,8-octanediol | 43.8 | Isophorone diisocyanate | 51.2 | Methyl-diethanolamine | 5.0 | — | — | Formic acid |
| 31 | 3,6-Dithia-1,8-octanediol | 33.0 | Isophorone diisocyanate | 47.6 | Methyl-diethanolamine | 19.4 | — | — | Formic acid |
| 32 | 3,6-Dithia-1,8-octanediol | 46.8 | Isophorone diisocyanate | 48.7 | t-Butyl-diethanolamine | 4.5 | — | — | Hydrochloric acid |
| 33 | 3,6-Dithia-1,8-octanediol | 32.9 | Isophorone diisocyanate | 46.6 | t-Butyl-diethanolamine | 20.5 | — | — | Hydrochloric acid |
| 34 | 5-Hydroxy-3,7-dithia-1,9-nonanediol | 44.7 | Isophorone diisocyanate | 50.3 | Methyl-diethanolamine | 5.0 | — | — | Formic acid |
| 35 | 5-Hydroxy-3,7-dithia-1,9-nonanediol | 33.4 | Isophorone diisocyanate | 46.8 | Methyl-diethanolamine | 19.9 | — | — | Formic acid |

PEGMME: Polyethylene glycol monomethyl ether
TMP-PO: Trimethylolpropane-PO adduct
PEG: Polyethylene glycol (molecular weight: 1,000)

The antioxidants 1 to 29, antioxidant 31, antioxidant 33 and antioxidant 35 were 20% water dispersions.

TABLE 2

Weight Average Molecular Weights and Molecular Weight Distributions of the Synthesized Antioxidants

| Antioxidant | Weight average molecular weight (Mw) | Molecular weight distribution (Mw/Mn) |
| --- | --- | --- |
| 1 | 4800 | 2.30 |
| 2 | 16800 | 1.92 |
| 3 | 15100 | 1.90 |
| 4 | 18200 | 1.87 |
| 5 | 15400 | 1.90 |
| 6 | 17300 | 2.13 |
| 7 | 15400 | 1.99 |
| 8 | 17200 | 1.99 |
| 9 | 13400 | 1.95 |
| 10 | 15300 | 2.11 |
| 11 | 12200 | 1.82 |
| 12 | 10100 | 2.09 |
| 13 | 11200 | 1.83 |
| 14 | 18300 | 2.34 |
| 15 | 15600 | 1.93 |
| 16 | 5600 | 2.13 |
| 17 | 14600 | 2.06 |
| 18 | 15400 | 2.11 |
| 19 | 15000 | 2.09 |
| 20 | 15600 | 2.18 |
| 21 | 15500 | 1.98 |
| 22 | 17100 | 2.04 |
| 23 | 12300 | 2.31 |
| 24 | 15400 | 2.12 |
| 25 | 12800 | 2.03 |
| 26 | 13500 | 2.19 |
| 27 | 12400 | 1.92 |
| 28 | 12300 | 1.82 |
| 29 | 15400 | 1.98 |
| 30 | 17900 | 1.98 |
| 31 | 18500 | 2.00 |
| 32 | 14600 | 1.93 |
| 33 | 15900 | 1.97 |
| 34 | 14900 | 2.12 |
| 35 | 14500 | 2.03 |

Example 1

To the above-mentioned alumina hydrate dispersion (100 parts), boric acid (0.4 part, 2% based on the alumina hydrate) and the antioxidant 1 (20% water dispersion, 2.0 parts in terms of solid weight, 10% based on the alumina hydrate) were added. Further, a 5% aqueous solution of polyvinyl alcohol ("PVA 245", product of KURARAY CO., LTD.) was added in an amount of 2 parts in terms of solid content (10% based on the alumina hydrate). The resulting mixture was stirred by "THREE-ONE MOTOR" until it turned into a homogeneous mixture. Using as a base material polyethylene-coated paper (product of Oji Paper Co., Ltd.; thickness: 224 μm, basis weight: 234 g/m$^2$, 60 deg. specular gloss as defined in JIS-Z-8741: 64%, special order product), the coating formulation prepared beforehand as described above was then coated on the polyethylene-coated paper by a Mayer bar to give a dry coat weight of 35 g/m$^2$. The polyethylene-coated paper with the coating formulation applied thereon was dried at 110° C. for 20 minutes by a dryer to produce a recording medium according to the present invention. The below-described assessment 1, assessment 2, assessment 3 and assessment 4 were performed on the recording medium. The results are shown in Table 3.

Example 2

A recording medium according to the present invention was produced in a similar manner as in Example 1 except that the antioxidant 1 was changed to the antioxidant 2. The below-described assessment 1, assessment 2, assessment 3 and assessment 4 were performed on the recording medium. The results are shown in Table 3.

Example 3

A recording medium according to the present invention was produced in a similar manner as in Example 1 except that the antioxidant 1 was changed to the antioxidant 3. The below-described assessment 1, assessment 2, assessment 3 and assessment 4 were performed on the recording medium. The results are shown in Table 3.

Example 4

A recording medium according to the present invention was produced in a similar manner as in Example 1 except that the antioxidant 1 was changed to the antioxidant 4. The below-described assessment 1, assessment 2, assessment 3 and assessment 4 were performed on the recording medium. The results are shown in Table 3.

Example 5

A recording medium according to the present invention was produced in a similar manner as in Example 1 except that the antioxidant 1 was changed to the antioxidant 5. The below-described assessment 1, assessment 2, assessment 3 and assessment 4 were performed on the recording medium. The results are shown in Table 3.

Example 6

A recording medium according to the present invention was produced in a similar manner as in Example 1 except that the antioxidant 1 was changed to the antioxidant 6. The below-described assessment 1, assessment 2, assessment 3 and assessment 4 were performed on the recording medium. The results are shown in Table 3.

Example 7

A recording medium according to the present invention was produced in a similar manner as in Example 1 except that the antioxidant 1 was changed to the antioxidant 7. The below-described assessment 1, assessment 2, assessment 3 and assessment 4 were performed on the recording medium. The results are shown in Table 3.

Example 8

A recording medium according to the present invention was produced in a similar manner as in Example 1 except that the antioxidant 1 was changed to the antioxidant 8. The below-described assessment 1, assessment 2, assessment 3 and assessment 4 were performed on the recording medium. The results are shown in Table 3.

Example 9

A recording medium according to the present invention was produced in a similar manner as in Example 1 except that the antioxidant 1 was changed to the antioxidant 9. The below-described assessment 1, assessment 2, assessment 3 and assessment 4 were performed on the recording medium. The results are shown in Table 3.

Example 10

A recording medium according to the present invention was produced in a similar manner as in Example 1 except that the antioxidant 1 was changed to the antioxidant 10. The below-described assessment 1, assessment 2, assessment 3 and assessment 4 were performed on the recording medium. The results are shown in Table 3.

Example 11

A recording medium according to the present invention was produced in a similar manner as in Example 1 except that the antioxidant 1 was changed to the antioxidant 11. The below-described assessment 1, assessment 2, assessment 3 and assessment 4 were performed on the recording medium. The results are shown in Table 3.

Example 12

A recording medium according to the present invention was produced in a similar manner as in Example 1 except that the antioxidant 1 was changed to the antioxidant 12. The below-described assessment 1, assessment 2, assessment 3 and assessment 4 were performed on the recording medium. The results are shown in Table 3.

Example 13

A recording medium according to the present invention was produced in a similar manner as in Example 1 except that the antioxidant 1 was changed to the antioxidant 13. The below-described assessment 1, assessment 2, assessment 3 and assessment 4 were performed on the recording medium. The results are shown in Table 3.

Example 14

A recording medium according to the present invention was produced in a similar manner as in Example 1 except that the antioxidant 1 was changed to the antioxidant 14. The below-described assessment 1, assessment 2, assessment 3 and assessment 4 were performed on the recording medium. The results are shown in Table 3.

Example 15

A recording medium according to the present invention was produced in a similar manner as in Example 1 except that the antioxidant 1 was changed to the antioxidant 15. The below-described assessment 1, assessment 2, assessment 3 and assessment 4 were performed on the recording medium. The results are shown in Table 3.

Example 16

A recording medium according to the present invention was produced in a similar manner as in Example 1 except that the antioxidant 1 was changed to the antioxidant 16. The below-described assessment 1, assessment 2, assessment 3 and assessment 4 were performed on the recording medium. The results are shown in Table 3.

Example 17

A recording medium according to the present invention was produced in a similar manner as in Example 1 except that the antioxidant 1 was changed to the antioxidant 17. The below-described assessment 1, assessment 2, assessment 3 and assessment 4 were performed on the recording medium. The results are shown in Table 3.

Example 18

A recording medium according to the present invention was produced in a similar manner as in Example 1 except that the antioxidant 1 was changed to the antioxidant 18. The below-described assessment 1, assessment 2, assessment 3 and assessment 4 were performed on the recording medium. The results are shown in Table 3.

Example 19

A recording medium according to the present invention was produced in a similar manner as in Example 1 except that the antioxidant 1 was changed to the antioxidant 19. The below-described assessment 1, assessment 2, assessment 3 and assessment 4 were performed on the recording medium. The results are shown in Table 3.

Example 20

A recording medium according to the present invention was produced in a similar manner as in Example 1 except that the antioxidant 1 was changed to the antioxidant 20. The below-described assessment 1, assessment 2, assessment 3 and assessment 4 were performed on the recording medium. The results are shown in Table 3.

Example 21

A recording medium according to the present invention was produced in a similar manner as in Example 1 except that the antioxidant 1 was changed to the antioxidant 21. The below-described assessment 1, assessment 2, assessment 3 and assessment 4 were performed on the recording medium. The results are shown in Table 3.

Example 22

A recording medium according to the present invention was produced in a similar manner as in Example 1 except that the antioxidant 1 was changed to the antioxidant 22. The below-described assessment 1, assessment 2, assessment 3 and assessment 4 were performed on the recording medium. The results are shown in Table 3.

Example 23

A recording medium according to the present invention was produced in a similar manner as in Example 1 except that the antioxidant 1 was changed to the antioxidant 23. The below-described assessment 1, assessment 2, assessment 3 and assessment 4 were performed on the recording medium. The results are shown in Table 3.

Example 24

A recording medium according to the present invention was produced in a similar manner as in Example 1 except that the antioxidant 1 was changed to the antioxidant 24. The below-described assessment 1, assessment 2, assessment 3 and assessment 4 were performed on the recording medium. The results are shown in Table 3.

Example 25

A recording medium according to the present invention was produced in a similar manner as in Example 1 except that the antioxidant 1 was changed to the antioxidant 25. The below-described assessment 1, assessment 2, assessment 3 and assessment 4 were performed on the recording medium. The results are shown in Table 3.

Example 26

A recording medium according to the present invention was produced in a similar manner as in Example 1 except that the antioxidant 1 was changed to the antioxidant 26. The below-described assessment 1, assessment 2, assessment 3 and assessment 4 were performed on the recording medium. The results are shown in Table 3.

Example 27

A recording medium according to the present invention was produced in a similar manner as in Example 1 except that the antioxidant 1 was changed to the antioxidant 27. The below-described assessment 1, assessment 2, assessment 3 and assessment 4 were performed on the recording medium. The results are shown in Table 3.

Example 28

A recording medium according to the present invention was produced in a similar manner as in Example 1 except that the antioxidant 1 was changed to the antioxidant 28. The below-described assessment 1, assessment 2, assessment 3 and assessment 4 were performed on the recording medium. The results are shown in Table 3.

Example 29

A recording medium according to the present invention was produced in a similar manner as in Example 1 except that the antioxidant 1 was changed to the antioxidant 29. The below-described assessment 1, assessment 2, assessment 3 and assessment 4 were performed on the recording medium. The results are shown in Table 3.

Example 30

A recording medium according to the present invention was produced in a similar manner as in Example 1 except that the antioxidant 1 was changed to the antioxidant 31. The below-described assessment 1, assessment 2, assessment 3 and assessment 4 were performed on the recording medium. The results are shown in Table 3.

Example 31

A recording medium according to the present invention was produced in a similar manner as in Example 1 except that the antioxidant 1 was changed to the antioxidant 33. The below-described assessment 1, assessment 2, assessment 3 and assessment 4 were performed on the recording medium. The results are shown in Table 3.

Example 32

A recording medium according to the present invention was produced in a similar manner as in Example 1 except that the antioxidant 1 was changed to the antioxidant 35. The below-described assessment 1, assessment 2, assessment 3 and assessment 4 were performed on the recording medium. The results are shown in Table 3.

Comparative Example 1

A recording medium of Comparative Example 1 was produced in a similar manner as in Example 1 except that the antioxidant 1 was not added. The below-described assessment 1, assessment 2, assessment 3 and assessment 4 were performed on the recording medium. The results are shown in Table 4.

Comparative Example 2

A recording medium of Comparative Example 2 was produced in a similar manner as in Example 1 except that 3,6-dithia-1,8-octanediol (0.8 part, 4% based on the alumina hydrate) was added in place of the antioxidant 1. The below-described assessment 1, assessment 2, assessment 3 and assessment 4 were performed on the recording medium. The results are shown in Table 4.

Comparative Example 3

A recording medium of Comparative Example 3 was produced in a similar manner as in Example 1 except that 2,2'-thiodiethanol (0.8 part, 4% based on the alumina hydrate) was added in place of the antioxidant 1. The below-described assessment 1, assessment 2, assessment 3 and assessment 4 were performed on the recording medium. The results are shown in Table 4.

Comparative Example 4

A recording medium of Comparative Example 4 was produced in a similar manner as in Example 1 except that 1-(2-hydroxyethylthio)propan-2-ol (0.8 part, 4% based on the alumina hydrate) was added in place of the antioxidant 1. The below-described assessment 1, assessment 2, assessment 3 and assessment 4 were performed on the recording medium. The results are shown in Table 4.

Comparative Example 5

A recording medium of Comparative Example 5 was produced in a similar manner as in Example 1 except that 6-oxa-3,9-dithia-1,11-undecanediol (0.8 part, 4% based on the alumina hydrate) was added in place of the antioxidant 1. The below-described assessment 1, assessment 2, assessment 3 and assessment 4 were performed on the recording medium. The results are shown in Table 4.

Comparative Example 6

A recording medium of Comparative Example 6 was produced in a similar manner as in Example 1 except that 5-hydroxy-3,7-dithia-1,9-nonanediol (0.8 part, 4% based on the alumina hydrate) was added in place of the antioxidant 1. The below-described assessment 1, assessment 2, assessment 3 and assessment 4 were performed on the recording medium. The results are shown in Table 4.

Comparative Example 7

A recording medium of Comparative Example 7 was produced in a similar manner as in Example 1 except that 1,2-bis(2,3-dihydroxypropylthio)ethane (0.8 part, 4% based on the alumina hydrate) was added in place of the antioxidant 1. The below-described assessment 1, assessment 2, assessment 3 and assessment 4 were performed on the recording medium. The results are shown in Table 4.

Comparative Example 8

A recording medium of Comparative Example 8 was produced in a similar manner as in Example 1 except that bis(2-(2-hydroxyethylthio)ethyl)sulfone (0.8 part, 4% based on the alumina hydrate) was added in place of the antioxidant 1. The below-described assessment 1, assessment 2, assessment 3 and assessment 4 were performed on the recording medium. The results are shown in Table 4.

Comparative Example 9

A recording medium of Comparative Example 9 was produced in a similar manner as in Example 1 except that 3,6-dithia-1,8-octanediol (2.0 parts, 10% based on the alumina hydrate) was added in place of the antioxidant 1. The below-described assessment 1, assessment 2, assessment 3 and assessment 4 were performed on the recording medium. The results are shown in Table 4.

Assessment 1: Assessment Method of Print Density

Using an inkjet recording system ("BJ F870", manufactured by Canon Kabushiki Kaisha), solid printing was performed on each recording medium, which had been produced as described above, with 100% ink coverage of single colors of black (Bk) ink, cyan (C) ink, magenta (M) ink and yellow (Y) ink. The optical densities of the respective colors were measured by using an optical reflection densitometer ("RD-918", manufactured by GretaMacbeth AG).

Assessment 2: Assessment Method of Inhibition Effects for Color Fading and Discoloration by Gas Using the inkjet recording system ("BJ F870", manufactured by Canon Kabushiki Kaisha), solid printing was performed on each recording medium, which had been produced as described above, with 100% ink coverage of single colors of black (Bk) ink and cyan (C) ink. The thus-printed recording medium was placed in ozone exposure testing equipment (special order equipment, manufactured by Suga Test Instruments Co., Ltd.), and under conditions of 40° C. and 55% R.H., was exposed to ozone of 1 ppm concentration for 4 hours. The optical densities of Bk and C were measured by using the optical reflection densitometer ("RD-918", manufactured by GretaMacbeth AG). The percent remainders of the ODs of Bk and C were calculated in accordance with the following equation (1) to assess the color fading and discoloration by the exposure to ozone.

Percent remainder of OD =(OD after test/OD before test)×100%    Equation (1)

Assessment 3: Assessment Method of Inhibition Effects for Color Fading and Discoloration by Light Using the inkjet recording system ("BJ F870", manufactured by Canon Kabushiki Kaisha), solid printing was performed on each recording medium, which had been produced as described above, with 100% ink coverage of the single color of the magenta (M) ink. The thus-printed recording medium was placed in an Atlas Fade-O-Meter (conditions: irradiation intensity 0.39 W/m$^2$ at 340 nm wavelength, temperature: 45° C., humidity: 70%), and after 100 hours, the optical density of M was measured by using the optical reflection densitometer ("RD-918", manufactured by GretaMacbeth AG). The percent remainder of the optical density of M was calculated in accordance with the equation (1) to perform an assessment.

Assessment 4: Assessment Method of Migration of Images at High Humidity

Using the inkjet recording system ("BJ F870", manufactured by Canon Kabushiki Kaisha), solid printing was performed on each recording medium, which had been produced as described above, with 100% ink coverage of single colors of black (Bk) ink, cyan (C) ink, magenta (M) ink and yellow (Y) ink. The thus-printed recording medium was exposed for 1 week to an environment of 30° C. and 80% R.H. The degree of migration of images was visually assessed. Each recording medium on which none of the colors underwent migration will be ranked "A", each recording medium on which any one of the colors underwent slight migration will be ranked "B", and each recording medium on which any one of the colors underwent substantial migration will be ranked "C".

TABLE 3

| | | | Examples | | | |
|---|---|---|---|---|---|---|
| Example | Added amount of anti-oxidant* (%) | Added amount of units of compound (A)**, (%) | Assessment 1 Print density (OD) | | | |
| | | | C | M | Y | Bk |
| 1 | 10 | 3.49 | 2.26 | 1.95 | 1.85 | 1.71 |
| 2 | 10 | 4.01 | 2.02 | 1.81 | 1.94 | 1.75 |
| 3 | 10 | 3.59 | 2.44 | 2.14 | 2.1 | 2.1 |
| 4 | 10 | 3.02 | 2.25 | 1.98 | 1.94 | 1.93 |
| 5 | 10 | 2.94 | 1.92 | 1.82 | 1.81 | 1.78 |
| 6 | 10 | 3.38 | 2.35 | 1.98 | 1.95 | 2.01 |
| 7 | 10 | 4.02 | 2.11 | 1.87 | 1.93 | 1.75 |
| 8 | 10 | 3.62 | 2.43 | 2.11 | 2.04 | 2.07 |
| 9 | 10 | 2.93 | 2.30 | 2.10 | 1.93 | 1.94 |
| 10 | 10 | 3.42 | 1.96 | 1.92 | 1.81 | 1.78 |
| 11 | 10 | 3.56 | 2.15 | 1.95 | 2.01 | 1.95 |
| 12 | 10 | 3.88 | 2.37 | 2.07 | 1.98 | 2.03 |
| 13 | 10 | 3.73 | 2.06 | 1.91 | 1.87 | 1.80 |
| 14 | 10 | 3.47 | 2.24 | 2.02 | 2.03 | 2.04 |
| 15 | 10 | 3.44 | 2.34 | 2.08 | 2.00 | 2.07 |
| 16 | 10 | 3.91 | 2.27 | 2.03 | 1.94 | 1.95 |
| 17 | 10 | 4.25 | 2.02 | 1.80 | 1.91 | 1.79 |
| 18 | 10 | 3.89 | 2.43 | 2.12 | 2.06 | 2.09 |
| 19 | 10 | 3.35 | 2.06 | 1.86 | 1.81 | 1.82 |
| 20 | 10 | 3.85 | 2.31 | 2.02 | 1.92 | 1.88 |
| 21 | 10 | 2.88 | 2.29 | 1.89 | 1.91 | 1.90 |
| 22 | 10 | 2.77 | 1.98 | 1.78 | 1.88 | 1.86 |
| 23 | 10 | 2.95 | 2.23 | 1.99 | 1.91 | 1.76 |
| 24 | 10 | 4.10 | 2.23 | 1.99 | 1.91 | 1.96 |
| 25 | 10 | 4.21 | 2.27 | 2.02 | 1.90 | 1.85 |
| 26 | 10 | 4.42 | 2.30 | 1.97 | 1.89 | 1.84 |
| 27 | 10 | 3.40 | 2.14 | 1.89 | 1.90 | 1.95 |
| 28 | 10 | 3.44 | 1.96 | 1.89 | 1.87 | 1.83 |
| 29 | 10 | 3.49 | 2.47 | 2.18 | 2.10 | 2.05 |
| 30 | 10 | 3.04 | 1.72 | 1.54 | 1.51 | 1.50 |
| 31 | 10 | 2.94 | 1.70 | 1.49 | 1.50 | 1.49 |
| 32 | 10 | 3.41 | 1.66 | 1.45 | 1.44 | 1.46 |

| Example | Assessment 2 Ozone fastness (1 ppm, 4 hours) | | Assessment 3 Light fastness (xenon, 100 hours) | Assessment 4 Migration (30° C., 80% RH, 1 week) |
|---|---|---|---|---|
| | C | Bk | M | |
| 1 | 99 | 85 | 91 | A |
| 2 | 98 | 83 | 91 | A |
| 3 | 98 | 82 | 91 | A |
| 4 | 96 | 76 | 85 | A |
| 5 | 100 | 80 | 92 | A |
| 6 | 98 | 82 | 91 | A |
| 7 | 98 | 82 | 91 | A |
| 8 | 99 | 80 | 93 | A |
| 9 | 97 | 78 | 90 | A |
| 10 | 98 | 83 | 89 | A |
| 11 | 96 | 84 | 84 | A |
| 12 | 99 | 86 | 96 | A |
| 13 | 96 | 81 | 94 | A |
| 14 | 95 | 81 | 88 | A |
| 15 | 97 | 88 | 87 | A |
| 16 | 99 | 84 | 96 | A |
| 17 | 100 | 92 | 93 | A |
| 18 | 99 | 86 | 93 | A |
| 19 | 98 | 86 | 91 | A |
| 20 | 98 | 84 | 93 | A |
| 21 | 97 | 84 | 93 | A |
| 22 | 97 | 84 | 93 | A |
| 23 | 95 | 82 | 93 | A |
| 24 | 95 | 81 | 92 | A |
| 25 | 99 | 87 | 95 | A |
| 26 | 100 | 88 | 93 | A |

TABLE 3-continued

Examples

| | | | | |
|---|---|---|---|---|
| 27 | 100 | 81 | 92 | A |
| 28 | 96 | 81 | 90 | A |
| 29 | 99 | 82 | 88 | A |
| 30 | 94 | 79 | 89 | A |
| 31 | 95 | 78 | 90 | A |
| 32 | 95 | 85 | 91 | A |

*Amount of the added antioxidant, in terms of solid content, based on the alumina hydrate.
**Added amount of the units of the compound (A) based on the alumina hydrate as calculated from the content of the units of the compound (A) in the antioxidant.

TABLE 4

Comparative Examples

| Comp. Ex. | Amount of added antioxidant* (%) | Assessment 1 Print density (OD) | | | | Assessment 2 Ozone fastness (1 ppm, 4 hours) | | Assessment 3 Light fastness (xenon, 100 hours) | Assessment 4 Migration (30° C., 80% RH, 1 week) |
|---|---|---|---|---|---|---|---|---|---|
| | | C | M | Y | Bk | C | Bk | M | |
| 1 | 0 | 2.49 | 2.20 | 2.11 | 2.12 | 81 | 40 | 70 | B |
| 2 | 4 | 2.42 | 2.16 | 2.05 | 1.97 | 98 | 80 | 80 | C |
| 3 | 4 | 2.35 | 2.02 | 1.88 | 1.97 | 83 | 42 | 73 | C |
| 4 | 4 | 2.38 | 2.00 | 1.89 | 1.88 | 85 | 46 | 72 | C |
| 5 | 4 | 2.32 | 2.02 | 1.88 | 1.91 | 96 | 93 | 76 | C |
| 6 | 4 | 2.35 | 2.04 | 1.83 | 1.87 | 96 | 81 | 75 | C |
| 7 | 4 | 2.33 | 2.03 | 1.91 | 1.90 | 97 | 80 | 78 | C |
| 8 | 4 | 2.34 | 2.03 | 1.89 | 1.94 | 82 | 49 | 70 | C |
| 9 | 10 | 2.12 | 1.91 | 1.82 | 1.79 | 99 | 94 | 79 | C |

*As defined in Table 3.

From the above-described results, the recording media of the present invention, which made use of the invention antioxidants of Examples 1-32 in their ink-receiving layers, respectively, were clearly improved in gas fastness, light fastness and the property against the migration of images at high temperature and high humidity over Comparative Example 1 in which no antioxidant was added. Further, the recording media of the present invention were also improved especially in light fastness and the property against the migration of images at high temperature and high humidity over the recording media of Comparative Examples 2-8 in which sulfide-containing diols such as 3,6-ditia-1,8-octanediol were added in substantially the same amount as the amount of units of the compound (A) contained in the antioxidants of the present invention. The antioxidants (the production procedures 1-29, 31, 33 and 35) employed in Examples 1-32 had dispersibility in water, whereas the antioxidants by the production procedures 30, 32 and 34 were poor in dispersibility and settled in a minute and were unable to produce recording media. From the foregoing, it was possible to provide antioxidants that can effectively prevent the color fading and discoloration of images by acidic gas in the atmosphere and light and the migration of images at high temperature and high humidity. In addition, the use of the antioxidants was able to provide recording media suited for the long-term storage of images.

Examples of the Second Antioxidant

In the synthesis of the second antioxidant according to the present invention, it is possible, as will be described hereinafter, to choose either a two-step reaction process or a single-step reaction process depending upon the desired structure and also to selectively determine the molecular weight and the repeating number of the polyol unit by changing the proportions of the compound (A), compound (E) and compound (B) to be used.

Production Procedure for an Antioxidant 36

An antioxidant 36 was produced by conducting its synthesis in two steps as will be described below.

First Step: Synthesis of a Prepolymer

Into a reaction vessel equipped with a stirrer, thermometer and reflux condenser, acetone (140 g) was charged as a reaction solvent. After 3,6-dithia-1,8-octanediol (50.00 g, 274.2 mmol) was dissolved under stirring, the solution was heated to 40° C. at which isophorone diisocyanate (71.48 g, 321.5 mmol) was added. The resulting mixture was then heated to 50° C., followed by the addition of a tin-based catalyst. The thus-obtained mixture was heated further to 55° C., at which a reaction was conducted for 4 hours under stirring to obtain a prepolymer for the antioxidant 36.

Second Step: Synthesis of the Antioxidant 36

Subsequently, polyethylene glycol (molecular weight: 1,000; 68.63 g, 68.6 mmol) was charged into the above-mentioned reaction vessel, followed by a reaction at 55° C. for 4 hours.

Subsequent to the completion of the reaction, the reaction mixture was cooled to room temperature. After water (600 g) was added, the resulting mixture was concentrated under reduced pressure to remove acetone. The content was then adjusted to obtain the antioxidant 36 of the present invention as a water dispersion the solid content of which was 20%.

As the synthesis of the antioxidant 36 was conducted in two steps, its structure is considered to contain units, in which thioether residual groups continue, and units, in which polyethylene glycol (PEG) residual groups continue, as shown by the below-described formula [1]. Further, an absorption ascribable to urethane bonds was confirmed by FT/IR (Fourier Transform Infrared Spectrophotometer; "FT/IR5300", manufactured by JASCO Corporation). By GPC (Gel Permeation Chromatography; controller: "SC8010", detector: "RI8012", manufactured by TOSOH CORPORATION), the weight average molecular weight and the molecular weight distributions (Mw/Mn), the ratio of the weight average molecular weight to the number average molecular weight (Mn), were determined to be 11,500 and 1.53, respectively. It has, therefore, been confirmed that polymerization took place and the added components were formed into a high-molecular compound.

Formula [1] Antioxidant 36

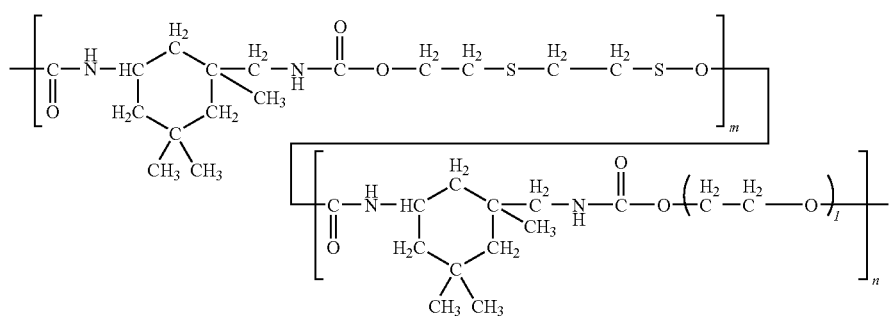

Production Procedure for an Antioxidant 37

An antioxidant 37 was produced by conducting its synthesis in a single step as will be described below.

Into a reaction vessel equipped with a stirrer, thermometer and reflux condenser, acetone (140 g) was charged as a reaction solvent. After 3,6-dithia-1,8-octanediol (50.00 g, 274.2 mmol) was dissolved under stirring, the solution was heated to 40° C. at which isophorone diisocyanate (71.48 g, 321.5 mmol) and polyethylene glycol (molecular weight: 1,000; 68.63 g, 68.6 mmol) were added. The resulting mixture was then heated to 50° C., followed by the addition of a tin-based catalyst. The thus-obtained mixture was heated further to 55° C., at which a reaction was conducted for 8 hours under stirring.

Subsequent to the completion of the reaction, the reaction mixture was cooled to room temperature. After water (600 g) was added, the resulting mixture was concentrated under reduced pressure to remove acetone. The content was then adjusted to obtain the antioxidant 37 of the present invention as a water dispersion the solid content of which was 20%.

As the antioxidant 37 was synthesized by the above-described single-step reaction, its structure is considered to contain units of a thioether and units of polyethylene glycol arranged at random as shown in the below-described formula [2]. Further, an absorption ascribable to urethane bonds was confirmed by FT/IR (Fourier Transform Infrared Spectrophotometer; "FT/IR5300", manufactured by JASCO Corporation). By GPC (Gel Permeation Chromatography; controller: "SC8010", detector: "RI8012", manufactured by TOSOH CORPORATION), the weight average molecular weight and the molecular weight distributions (Mw/Mn), the ratio of the weight average molecular weight to the number average molecular weight (Mn), were determined to be 10,300 and 1.72, respectively. It has, therefore, been confirmed that polymerization took place and the added components were formed into a high-molecular compound.

Production Procedure for an Antioxidant 38

An antioxidant 38 was produced by conducting its synthesis in a single step as will be described below.

Into a reaction vessel equipped with a stirrer, thermometer and reflux condenser, acetone (140 g) was charged as a reaction solvent. After 3,6-dithia-1,8-octanediol (50.00 g, 274.2 mmol) was dissolved under stirring, the solution was heated to 40° C. at which isophorone diisocyanate (61.77 g, 277.8 mmol) and polyethylene glycol (molecular weight: 1,000; 15.82 g, 15.8 mmol) were added. The resulting mixture was then heated to 50° C., followed by the addition of a tin-based catalyst. The thus-obtained mixture was heated further to 55° C., at which a reaction was conducted for 8 hours under stirring.

Subsequent to the completion of the reaction, the reaction mixture was cooled to room temperature. After water (600 g) was added, the resulting mixture was concentrated under reduced pressure to remove acetone. The content was then adjusted to obtain the antioxidant 38 of the present invention as a water dispersion the solid content of which was 20%.

As the antioxidant 38 was synthesized by the above-described single-step reaction, it is considered to have a random structure like the antioxidant 37. Further, an absorption ascribable to urethane bonds was confirmed by FT/IR (Fourier Transform Infrared Spectrophotometer; "FT/IR5300", manufactured by JASCO Corporation). By GPC (Gel Permeation Chromatography; controller: "SC8010", detector: "RI8012", manufactured by TOSOH CORPORATION), the weight average molecular weight and the molecular weight distributions (Mw/Mn), the ratio of the weight average molecular weight to the number average molecular weight (Mn), were determined to be 5,900 and 1.64, respectively. It has, therefore, been confirmed that polymerization took place and the added components were formed into a high-molecular compound.

Formula [2] Antioxidant 37

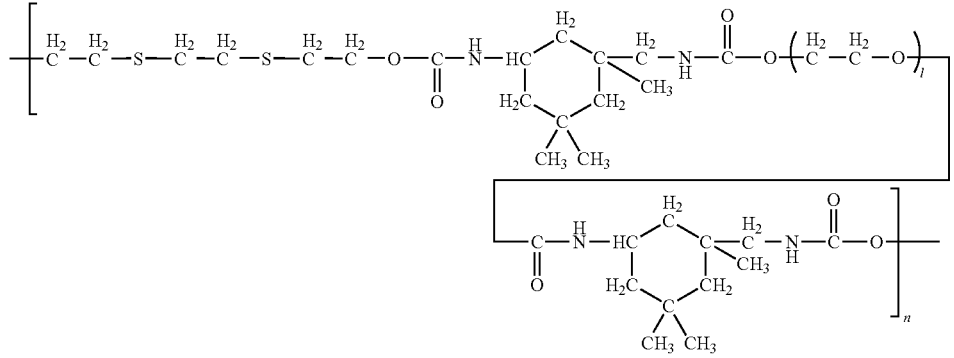

Production Procedure for an Antioxidant 39

An antioxidant 38 was produced by conducting its synthesis in a single step as will be described below. Into a reaction vessel equipped with a stirrer, thermometer and reflux condenser, acetone (226 g) was charged as a reaction solvent. After 3,6-dithia-1,8-octanediol (40.00 g), t-butyldiethanolamine (9.46 g) and polyethylene glycol (molecular weight: 1,000; 1.40 g) were dissolved under stirring, the solution was heated to 40° C. at which isophorone diisocyanate (61.51 g) were added. The resulting mixture was then heated to 50° C., followed by the addition of a tin-based catalyst (0.4 g). The thus-obtained mixture was heated further to 55° C., at which a reaction was conducted for 4 hours under stirring.

Subsequent to the completion of the reaction, the reaction mixture was cooled to room temperature, and then, 35% hydrochloric acid (6.11 g) was added to effect neutralization. After water (460 g) was added further, the resulting mixture was concentrated under reduced pressure to remove acetone. Water was added further to adjust the solid content such that the antioxidant 39 of the present invention was obtained as a water dispersion the solid content of which was 20%.

As the antioxidant 39 was synthesized by the above-described single-step reaction like the antioxidant 38, it is also considered to have a random structure. Further, an absorption ascribable to urethane bonds was confirmed by FT/IR (Fourier Transform Infrared Spectrophotometer; "FT/IR5300", manufactured by JASCO Corporation). By GPC (Gel Permeation Chromatography; controller: "SC8010", detector: "RI8012", manufactured by TOSOH CORPORATION), the weight average molecular weight and the molecular weight distributions (Mw/Mn), the ratio of the weight average molecular weight to the number average molecular weight (Mn), were determined to be 15,400 and 1.98, respectively. It has, therefore, been confirmed that polymerization took place and the added components were formed into a high-molecular compound.

224 µm, basis weight: 234 g/m², 60 deg. specular gloss as defined in JIS-Z-8741: 64%, special order product), the coating formulation prepared beforehand as described above was then coated on the polyethylene-coated paper by a Mayer bar to give a dry coat weight of 35 g/m². The polyethylene-coated paper with the coating formulation applied thereon was dried at 110° C. for 20 minutes by a dryer to produce a recording medium according to the present invention. The below-described assessment 1, assessment 2, assessment 3 and assessment 4 were performed on the recording medium. The results are shown in Table 5.

Example 34

A recording medium according to the present invention was produced in a similar manner as in Example 33 except that the antioxidant 36 was changed to the antioxidant 37. The below-described assessment 1, assessment 2, assessment 3 and assessment 4 were performed on the recording medium. The results are shown in Table 5.

Example 35

A recording medium according to the present invention was produced in a similar manner as in Example 33 except that the antioxidant 36 was changed to the antioxidant 38. The below-described assessment 1, assessment 2, assessment 3 and assessment 4 were performed on the recording medium. The results are shown in Table 5.

Example 36

A recording medium according to the present invention was produced in a similar manner as in Example 33 except that the antioxidant 36 was changed to the antioxidant 39. The below-described assessment 1, assessment 2, assessment 3 and assessment 4 were performed on the recording medium. The results are shown in Table 5.

Formula [3] Antioxidant 39

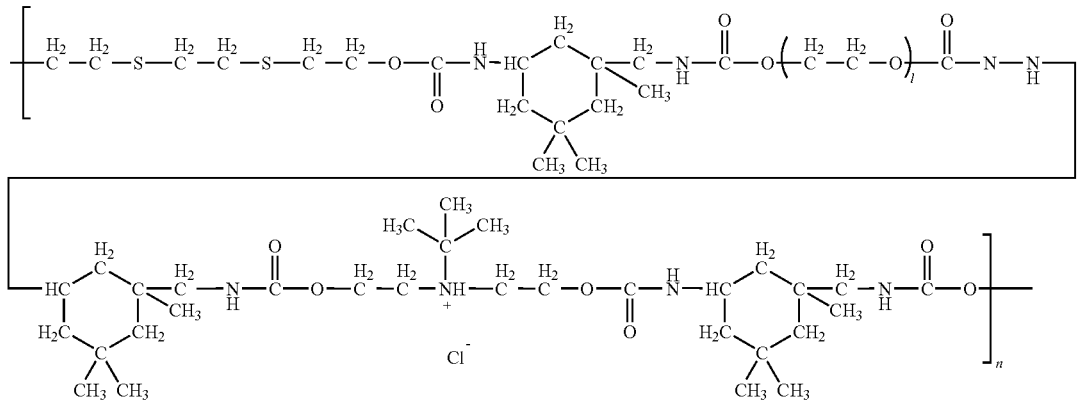

Example 33

To the above-mentioned alumina hydrate dispersion (100 parts), boric acid (0.4 part, 2% based on the alumina hydrate) and the antioxidant 36 (20% water dispersion, 2.0 parts in terms of solid weight, 10% based on the alumina hydrate) were added. Further, a 5% aqueous solution of polyvinyl alcohol ("PVA 245", product of KURARAY CO., LTD.) was added in an amount of 2 parts in terms of solid content (10% based on the alumina hydrate). The resulting mixture was stirred by "THREE-ONE MOTOR" until it turned into a homogeneous mixture. Using as a base material polyethylene-coated paper (product of Oji Paper Co., Ltd.; thickness:

Example 37

A recording medium according to the present invention was produced in a similar manner as in Example 33 except that base paper having a Stoeckigt sizing degree of 27 seconds as measured by JIS P8122 was used as a base material. The below-described assessment 1, assessment 2, assessment 3 and assessment 4 were performed on the recording medium. The results are shown in Table 5.

Comparative Example 10

A recording medium was produced in a similar manner as in Example 33 except that the antioxidant 36 was not added. The below-described assessment 1, assessment 2, assessment 3 and assessment 4 were performed on the recording medium. The results are shown in Table 5.

Comparative Example 11

A recording medium according to the present invention was produced in a similar manner as in Example 33 except that 3,6-dithia-1,8-octanediol (0.52 part, 2.6% based on the alumina hydrate) was added in place of the antioxidant 36. The below-described assessment 1, assessment 2, assessment 3 and assessment 4 were performed on the recording medium. The results are shown in Table 5.

Comparative Example 12

A recording medium according to the present invention was produced in a similar manner as in Example 33 except that 3,6-dithia-1,8-octanediol (0.8 part, 4% based on the alumina hydrate) was added in place of the antioxidant 36. The below-described assessment 1, assessment 2, assessment 3 and assessment 4 were performed on the recording medium. The results are shown in Table 5.

Comparative Example 13

A recording medium was produced as a comparative example in a similar manner as in Example 37 except that the antioxidant 36 was not added. The below-described assessment 1, assessment 2, assessment 3 and assessment 4 were performed on the recording medium. The results are shown in Table 5.

Assessment 1: Assessment Method of Inhibition Effects for Color Fading and Discoloration by Gas (Percent Remainder of OD)

Using the inkjet recording system ("BJ F870", manufactured by Canon Kabushiki Kaisha), solid printing was performed with 100% ink coverage of the single color of the black (Bk) ink. Each recording medium so printed was placed in the ozone exposure testing equipment (special order equipment, manufactured by Suga Test Instruments Co., Ltd.), and under conditions of 40° C. and 55% R.H., was exposed to ozone of 1 ppm concentration for 4 hours. The optical density of Bk was measured by using the optical reflection densitometer ("RD-918", manufactured by GretaMacbeth AG). The percent remainder of the OD of Bk was calculated in accordance with the following equation (1) to assess the color fading and discoloration by the exposure to ozone.

Percent remainder of OD=(OD after test/OD before test)×100%  Equation (1)

Assessment 2: Assessment Method of Inhibition Effects for Color Fading and Discoloration by Gas (ΔE*)

Using the inkjet recording system ("BJ F870", manufactured by Canon Kabushiki Kaisha), solid printing was performed with 100% ink coverage of the single color of the black (Bk) ink. Each recording medium so printed was placed in the ozone exposure testing equipment (special order equipment, manufactured by Suga Test Instruments Co., Ltd.), and under conditions of 40° C. and 55% R.H., was exposed to ozone of 1 ppm concentration for 4 hours. Using a spectral color-difference meter, "ZE2000" (manufactured by Nippon Denshoku Industries Co., Ltd.), the L*a*b* value (the coordinates on the L*a*b* calorimetric system according to the color difference method as defined by CIE) of Bk was measured both before and after the test. Using ΔE* as defined by the below-described equation (2), the discoloration after the test was assessed.

$$\Delta E^* = [(\Delta L^*)^2 + (\Delta a^*)^2 + (\Delta b^*)^2]^{1/2} \qquad \text{Equation (2)}$$

wherein ΔL*, Δa* and Δb* mean differences in the L*, a* and b* coordinates on the L*a*b* colorimetric system between Bk before the test and that after the test.

Assessment 3: Assessment Method of Inhibition Effects for Color Fading and Discoloration by Light (Percent Remainder of OD)

Using the inkjet recording system ("BJ F870", manufactured by Canon Kabushiki Kaisha), solid printing was performed with 100% ink coverage of the single color of the magenta (M) ink. Each recording medium so printed was placed in the Atlas Fade-O-Meter (conditions: irradiation intensity 0.39 W/m² at 340 nm wavelength, temperature: 45° C., humidity: 50%), and after 100 hours, the optical density of M was measured by using the optical reflection densitometer ("RD-918", manufactured by GretaMacbeth AG). The percent remainder of the optical density of M was calculated in accordance with the equation (1) to perform an assessment.

Assessment 4: Assessment Method of Migration of Images at High Humidity

Using the inkjet recording system ("BJ F870", manufactured by Canon Kabushiki Kaisha), solid printing was performed with 100% ink coverage of single colors of yellow (Y) ink, magenta (M) ink, cyan (C) ink and black (Bk) ink. Each recording medium so printed was exposed for 1 week to an environment of 30° C. and 80% R.H. The degree of migration of images was visually assessed. Each recording medium on which none of the colors underwent migration will be ranked "A", each recording medium on which any one of the colors underwent slight migration will be ranked "B", and each recording medium on which any one of the colors underwent substantial migration will be ranked "C".

TABLE 5

|  | Example | | | | | Comparative Example | | | |
| --- | --- | --- | --- | --- | --- | --- | --- | --- | --- |
|  | 33 | 34 | 35 | 36 | 37 | 10 | 11 | 12 | 13 |
| Added antioxidant | 36 | 37 | 38 | 39 | 36 | None | * | * | None |
| Charged amount of 3,6-dithia-1,8-octanediol (%) | 26.3 | 26.3 | 39.2 | 35.6 | 26.3 | — | — | — | — |
| Charged amount of isophorone diisocyanate (%) | 37.6 | 37.6 | 48.4 | 54.7 | 37.6 | — | — | — | — |

TABLE 5-continued

|  |  | Example | | | | | Comparative Example | | | |
|---|---|---|---|---|---|---|---|---|---|---|
|  |  | 33 | 34 | 35 | 36 | 37 | 10 | 11 | 12 | 13 |
| Charged amount of polyethylene glycol (%) | | 36.1 | 36.1 | 12.4 | 1.3 | 36.1 | — | — | — | — |
| Charged amount of 5-butyldiethanolamine (%) | | — | — | — | 8.4 | — | — | — | — | — |
| Added amount** (%) | | 10.0 | 10.0 | 10.0 | 10.0 | 10.0 | 0 | 2.6 | 4.0 | 0 |
| Assessment 1 | Percent remainder of OD | 83 | 82 | 93 | 82 | 78 | 40 | 72 | 80 | 36 |
| Assessment 2 | ΔE** | 17.16 | 16.06 | 5.59 | 16.12 | 19.5 | 63.20 | 31.22 | 19.28 | 65.50 |
| Assessment 3 | Percent remainder of OD | 80 | 81 | 92 | 88 | 76.5 | 70 | 80 | 80 | 70 |
| Assessment 4 | | A | A | A | A | A | B | C | C | B |

* 3,6-Dithia-1,8-octanediol
**As defined in Table 3

From the above-described results, the invention recording media of Examples 33-36, which made use of the invention antioxidants 36-39 in their ink-receiving layers, respectively, were clearly improved in gas fastness, light fastness and the property against the migration of images at high temperature and high humidity over the recording media of Comparative Example 10, in which no antioxidant was added, and Comparative Examples 11 and 12 in which 3,6-dithia-1,8-octanediol was added. In the case of Example 37 in which the base material was paper, improvements were also confirmed in storability over Comparative Example 13 in which no antioxidant was added. From the foregoing, it was possible to provide antioxidants that can effectively prevent the color fading and discoloration of images, which are caused by acidic gas in the atmosphere and light, and the migration of images at high temperature and high humidity. In addition, the use of the antioxidants was able to provide recording media suited for the long-term storage of images.

INDUSTRIAL APPLICABILITY

Recording media making use of an antioxidant according to the present invention in at least their ink-receiving layers can effectively prevent the color fading and discoloration of images, which are caused by acidic gas in the atmosphere and light, and the migration of images at high temperature and high humidity, and therefore, are suited for the long-term storage of images.

The invention claimed is:

1. A high-molecular antioxidant obtained by reacting at least three compounds of (A) a sulfur-containing organic compound having at least two active hydrogen atoms, (B) a polyisocyanate compound having at least two isocyanate groups and (C) an amine compound having at least two active hydrogen atoms and then cationizing with an acid at least some of amino groups in a resultant reaction product.

2. A high-molecular antioxidant according to claim 1, wherein a content of said amine compound (C) in said reaction product is from 5.5 to 18.5% in terms of molar percentage.

3. A high-molecular antioxidant according to claim 1, wherein said acid is at least one of a phosphoric acid and a monovalent acid.

4. A high-molecular antioxidant according to claim 3, wherein said monovalent acid is a hydroxy acid.

5. A high-molecular antioxidant according to claim 1, wherein said sulfur-containing organic compound (A) contains at least one sulfide group in a molecule thereof.

6. A high-molecular antioxidant according to claim 1, wherein said sulfur-containing organic compound (A) has at least three active hydrogen atoms, at least one of which is contained in a hydroxyl group.

7. A high-molecular antioxidant according to claim 1, which is at least one of compounds represented by the following formulas (1) to (6), respectively:

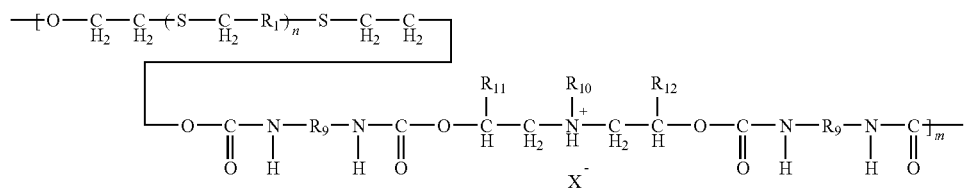

Formula (1)

wherein n stands for 1 or 2, $R_1$ represents a methylene, ethylene or propylene group, $R_9$ represents an aliphatic hydrocarbon group containing at least one alkylene group or an aliphatic hydrocarbon group containing at least one heteroalicyclic or alicyclic group, $R_{10}$ represents an alkyl group having 1 to 4 carbon atoms, $R_{11}$ and $R_{12}$ each independently represents a hydrogen atom or a methyl group, $X^-$ represents an acid anion, and m stands for a number sufficient to give a weight average molecular weight of from 2,000 to 150,000;

Formula (2)

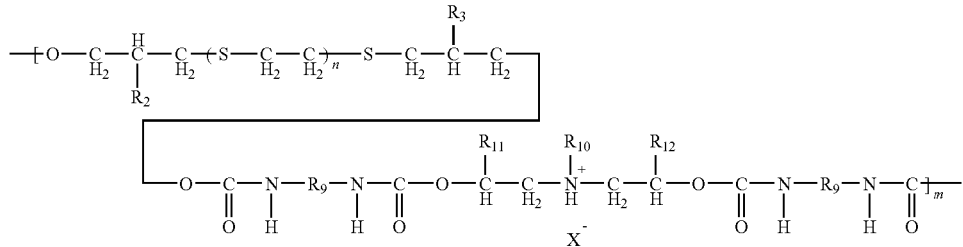

wherein n stands for 1 or 2, $R_2$ and $R_3$ each independently represents a hydrogen atom or a hydroxyl or alkyl group, $R_2$ and $R_3$ may be the same or different, and $R_9$ to $R_{12}$, $X^-$ and m have the same meanings as defined in Formula (1);

Formula (3)

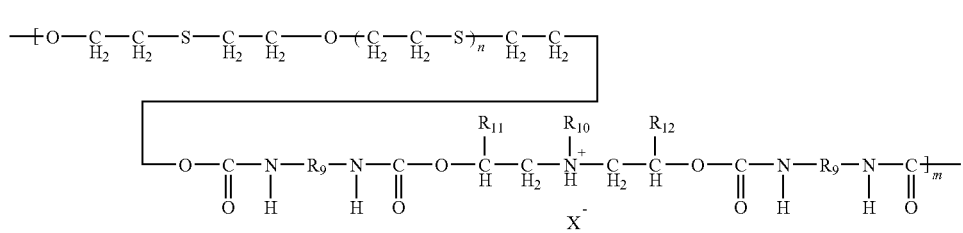

wherein n stands for 0 or 1, and $R_9$ to $R_{12}$, $X^-$ and m have the same meanings as defined in Formula (1);

Formula (4)

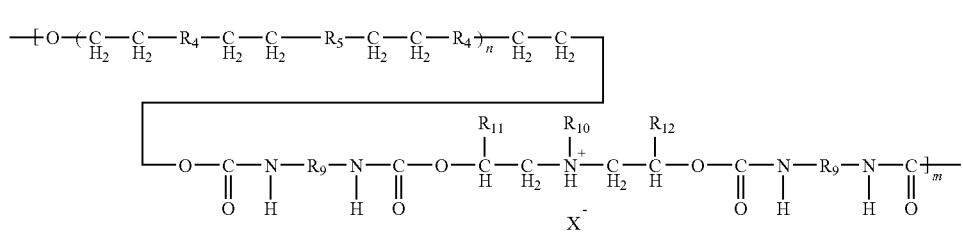

wherein n stands for 1 or 2, $R_4$ represents a sulfur or oxygen atom, $R_5$ represents a sulfur atom or $-SO_2-$, $R_4$ and $R_5$ are not the same but are different, and $R_9$ to $R_{12}$, $X^-$ and m have the same meanings as defined in Formula (1);

wherein $R_6$ and $R_7$ each independently represents a hydrogen atom or an alkyl group, $R_6$ and $R_7$ may be the same or different, and $R_9$ to $R_{12}$, $X^-$ and m have the same meanings as defined in Formula (1); and Formula (5)

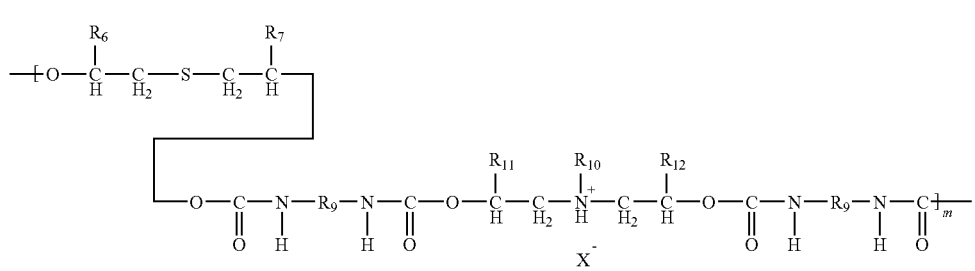

Formula (6)

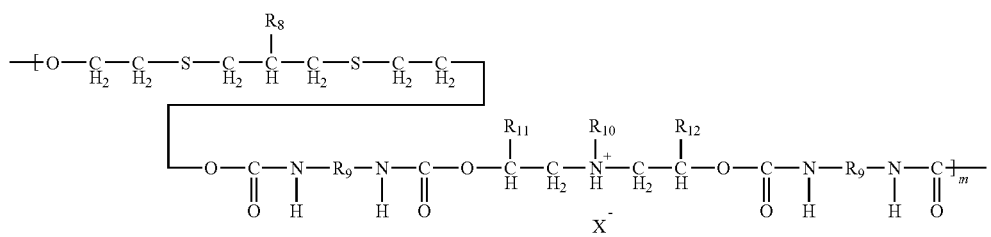

wherein $R_8$ represents a hydroxyl or alkyl group, and $R_9$ to $R_{12}$, $X^-$ and m have the same meanings as defined in Formula (1).

8. A high-molecular antioxidant according to claim 1, wherein said sulfur-containing organic compound (A) is at least one of compounds represented by formulas (7) to (12), respectively:

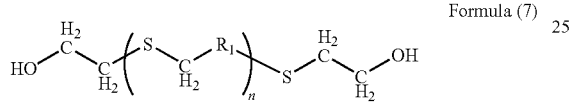

Formula (7)

wherein n stands for 1 or 2, and $R_1$ represents a methylene, ethylene or propylene group;

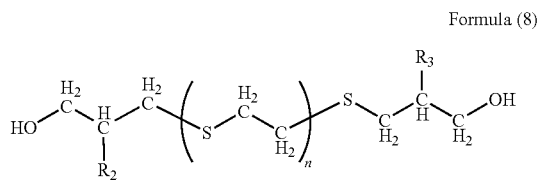

Formula (8)

wherein n stands for 1 or 2, $R_2$ and $R_3$ each independently represents a hydrogen atom or a hydroxyl or alkyl group, and $R_2$ and $R_3$ may be the same or different;

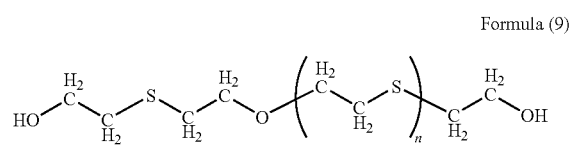

Formula (9)

wherein n stands for 0 or 1;

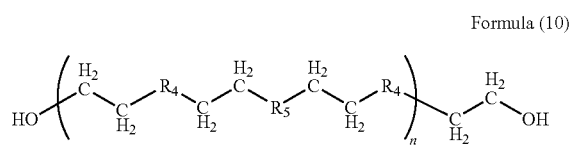

Formula (10)

wherein n stands for 1 or 2, $R_4$ represents a sulfur or oxygen atom, $R_5$ represents a sulfur atom or —$SO_2$—, and $R_4$ and $R_5$ are not the same but are different;

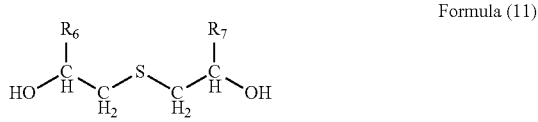

Formula (11)

wherein $R_6$ and $R_7$ each independently represents a hydrogen atom or an alkyl group, and $R_6$ and $R_7$ may be the same or different; and

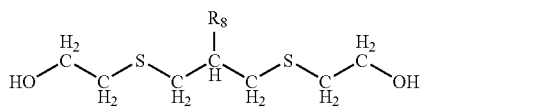

Formula (12)

wherein $R_8$ represents a hydroxyl or alkyl group.

9. A recording medium provided on at least one side of a base material with at least one ink-receiving layer, wherein at least said ink-receiving layer contains at least one antioxidant according to claim 1.

10. A high-molecular compound obtained by reacting at least three compounds of (A) a sulfur-containing organic compound having at least two active hydrogen atoms, (B) a polyisocyanate compound having at least two isocyanate groups and (C) an amine compound having at least two active hydrogen atoms and then cationizing with an acid at least some of amino groups in a resultant reaction product, wherein said sulfur-containing organic compound (A) contains at least one sulfide group in a molecule thereof.

11. A high-molecular compound according to claim 10, wherein a content of said amine compound (C) in said reaction product is from 5.5 to 18.5% in terms of molar percentage.

12. A high-molecular compound according to claim 10, wherein said acid is at least one of a phosphoric acid and a monovalent acid.

13. A high-molecular compound according to claim 12, wherein said monovalent acid is a hydroxy acid.

14. A high-molecular compound according to claim 10, wherein said sulfur-containing organic compound (A) has at least three active hydrogen atoms, at least one of which is a hydroxyl group.

15. A high-molecular compound according to claim 10, which is at least one of compounds represented by the following formulas (1) to (6), respectively:

Formula (1)

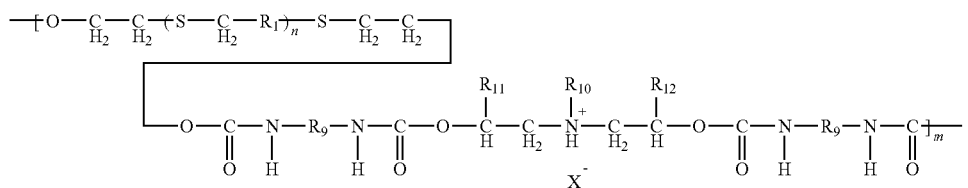

wherein n stands for 1 or 2 $R_1$ represents a methylene, ethylene or propylene group, $R_9$ represents an aliphatic hydrocarbon group containing at least one alkylene group or an aliphatic hydrocarbon group containing at least one heteroalicyclic or alicyclic group, $R_{10}$ represents an alkyl group having 1 to 4 carbon atoms, $R_{11}$ and $R_{12}$ each independently represents a hydrogen atom or a methyl group, $X^-$ represents an acid anion, and m stands for a number sufficient to give a weight average molecular weight of from 2,000 to 150,000;

Formula (2)

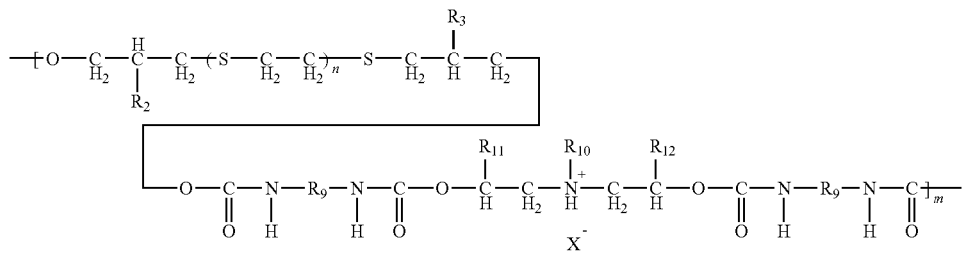

wherein n stands for 1 or 2, $R_2$ and $R_3$ each independently represents a hydrogen atom or a hydroxyl or alkyl group, $R_2$ and $R_3$ may be the same or different, and $R_9$ to $R_{12}$, $X^-$ and m have the same meanings as defined in Formula (1);

Formula (3)

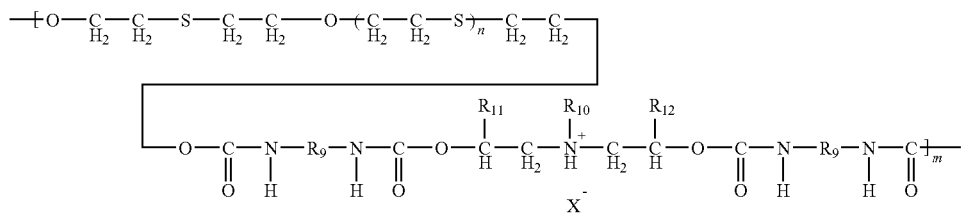

wherein n stands for 0 or 1 and $R_9$ to $R_{12}$ $X^-$ and m have the same meanings as defined in Formula (1);

Formula (4)

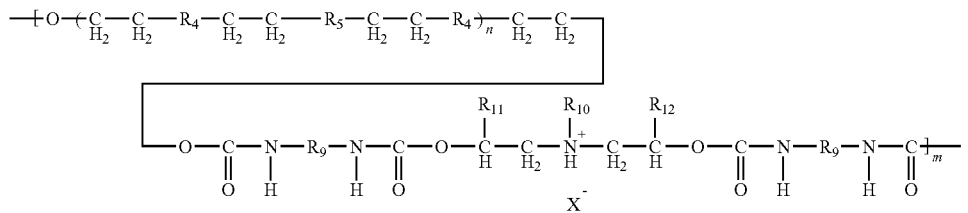

wherein n stands for 1 or 2, $R_4$ represents a sulfur or oxygen atom, $R_5$ represents a sulfur atom or —$SO_2$—, $R_4$ and $R_5$ are not the same but are different, and $R_9$ to $R_{12}$, $X^-$ and m have the same meanings as defined in Formula (1);

Formula (5)

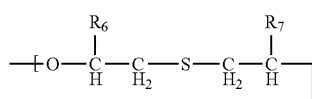
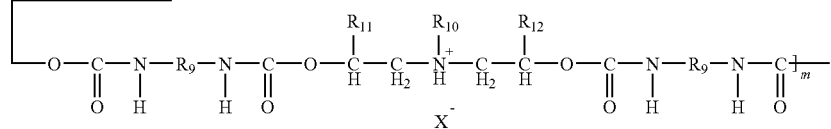

wherein $R_6$ and $R_7$ each independently represents a hydrogen atom or an alkyl group, $R_6$ and $R_7$ may be the same or different, and $R_9$ to $R_{12}$, $X^-$ and m have the same meanings as defined in Formula (1); and Formula (6)

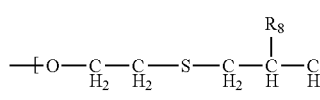
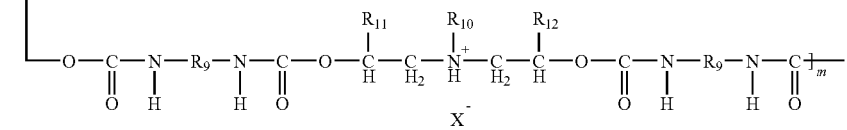

wherein $R_8$ represents a hydroxyl or alkyl group, and $R_9$ to $R_{12}$, $X^-$ and m have the same meanings as defined in Formula (1).

16. A high-molecular compound according to claim 10, wherein said sulfur-containing organic compound (A) is at least one of compounds represented by the following formulas (7) to (12), respectively:

Formula (7)

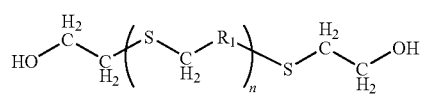

wherein n stands for 1 or 2, and $R_1$ represents a methylene, ethylene or propylene group;

Formula (8)

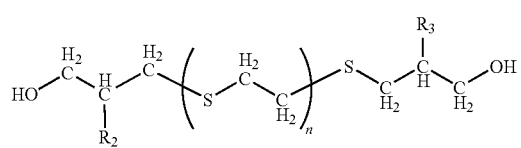

wherein n stands for 1 or 2, $R_2$ and $R_3$ each independently represents a hydrogen atom or a hydroxyl or alkyl group, and $R_2$ and $R_3$ may be the same or different;

Formula (9)

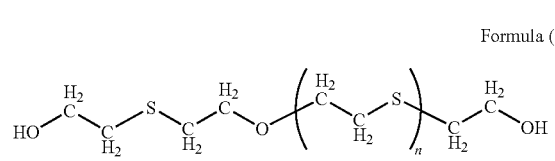

wherein n stands for 0 or 1;

Formula (10)

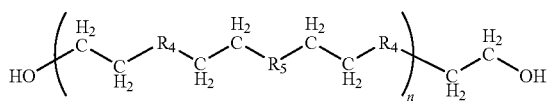

wherein n stands for 1 or 2, $R_4$ represents a sulfur or oxygen atom, $R_5$ represents a sulfur atom or —$SO_2$—, and $R_4$ and $R_5$ are not the same but are different;

Formula (11)

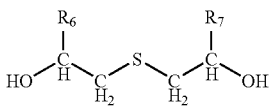

wherein $R_6$ and $R_7$ each independently represents a hydrogen atom or an alkyl group, and $R_6$ and $R_7$ may be the same or different; and Formula (12)

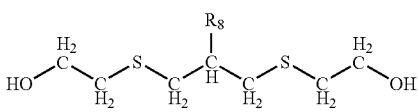

wherein $R_8$ represents a hydroxyl or alkyl group.

* * * * *